(12) United States Patent
Dutta et al.

(10) Patent No.: US 10,705,882 B2
(45) Date of Patent: Jul. 7, 2020

(54) SYSTEM AND METHOD FOR RESOURCE PLACEMENT ACROSS CLOUDS FOR DATA INTENSIVE WORKLOADS

(71) Applicant: Cisco Technology, Inc., San Jose, CA (US)

(72) Inventors: Debojyoti Dutta, Santa Clara, CA (US); Xinyuan Huang, San Jose, CA (US)

(73) Assignee: CISCO TECHNOLOGY, INC., San Jose, CA (US)

(*) Notice: Subject to any disclaimer, the term of this patent is extended or adjusted under 35 U.S.C. 154(b) by 155 days.

(21) Appl. No.: 15/850,230

(22) Filed: Dec. 21, 2017

(65) Prior Publication Data
US 2019/0196879 A1    Jun. 27, 2019

(51) Int. Cl.
G06F 9/50     (2006.01)
H04L 12/24    (2006.01)

(52) U.S. Cl.
CPC ............ *G06F 9/5083* (2013.01); *G06F 9/505* (2013.01); *G06F 9/5038* (2013.01); *G06F 9/5044* (2013.01); *H04L 41/0803* (2013.01)

(58) Field of Classification Search
CPC combination set(s) only.
See application file for complete search history.

(56) References Cited

U.S. PATENT DOCUMENTS

| 5,812,773 A | 9/1998 | Norin |
| 5,889,896 A | 3/1999 | Meshinsky et al. |
| 6,108,782 A | 8/2000 | Fletcher et al. |

(Continued)

FOREIGN PATENT DOCUMENTS

| CN | 101719930 | 6/2010 |
| CN | 101394360 | 7/2011 |

(Continued)

OTHER PUBLICATIONS

International Search Report and Written Opinion from the International Searching Authority, dated May 17, 2019, 11 pages, for corresponding International Patent Application No. PCT/US2018/066469.

(Continued)

*Primary Examiner* — El Hadji M Sall
(74) *Attorney, Agent, or Firm* — Polsinelli PC

(57) ABSTRACT

Systems, methods, computer-readable media are disclosed for determining a point of delivery (POD) device or network component on a cloud for workload and resource placement in a multi-cloud environment. A method includes determining a first amount of data for transitioning from performing a first function on input data to performing a second function on a first outcome of the first function; determining a second amount of data for transitioning from performing the second function on the first outcome to performing a third function on a second outcome of the second function; determining a processing capacity for each of one or more network nodes on which the first function and the third function are implemented; and selecting the network node for implementing the second function based on the first amount of data, the second amount of data, and the processing capacity for each of the network nodes.

20 Claims, 9 Drawing Sheets

(56) References Cited

U.S. PATENT DOCUMENTS

| | | |
|---|---|---|
| 6,178,453 B1 | 1/2001 | Mattaway et al. |
| 6,298,153 B1 | 10/2001 | Oishi |
| 6,343,290 B1 | 1/2002 | Cossins et al. |
| 6,643,260 B1 | 11/2003 | Kloth et al. |
| 6,683,873 B1 | 1/2004 | Kwok et al. |
| 6,721,804 B1 | 4/2004 | Rubin et al. |
| 6,733,449 B1 | 5/2004 | Krishnamurthy et al. |
| 6,735,631 B1 | 5/2004 | Oehrke et al. |
| 6,996,615 B1 | 2/2006 | McGuire |
| 7,054,930 B1 | 5/2006 | Cheriton |
| 7,058,706 B1 | 6/2006 | Lyer et al. |
| 7,062,571 B1 | 6/2006 | Dale et al. |
| 7,111,177 B1 | 9/2006 | Chauvel et al. |
| 7,212,490 B1 | 5/2007 | Kao et al. |
| 7,277,948 B2 | 10/2007 | Igarashi et al. |
| 7,313,667 B1 | 12/2007 | Pullela et al. |
| 7,379,846 B1 | 5/2008 | Williams et al. |
| 7,480,672 B2 | 1/2009 | Hahn et al. |
| 7,496,043 B1 | 2/2009 | Leong et al. |
| 7,536,476 B1 | 5/2009 | Alleyne |
| 7,567,504 B2 | 7/2009 | Darling et al. |
| 7,583,665 B1 | 9/2009 | Duncan et al. |
| 7,606,147 B2 | 10/2009 | Luft et al. |
| 7,644,437 B2 | 1/2010 | Volpano |
| 7,647,594 B2 | 1/2010 | Togawa |
| 7,773,510 B2 | 8/2010 | Back et al. |
| 7,808,897 B1 | 10/2010 | Mehta et al. |
| 7,881,957 B1 | 2/2011 | Cohen et al. |
| 7,917,647 B2 | 3/2011 | Cooper et al. |
| 7,970,905 B2 | 6/2011 | Baskaran et al. |
| 8,010,598 B2 | 8/2011 | Tanimoto |
| 8,028,071 B1 | 9/2011 | Mahalingam et al. |
| 8,041,714 B2 | 10/2011 | Aymeloglu et al. |
| 8,121,117 B1 | 2/2012 | Amdahl et al. |
| 8,171,415 B2 | 5/2012 | Appleyard et al. |
| 8,234,377 B2 | 7/2012 | Cohn |
| 8,244,559 B2 | 8/2012 | Horvitz et al. |
| 8,250,215 B2 | 8/2012 | Stienhans et al. |
| 8,280,880 B1 | 10/2012 | Aymeloglu et al. |
| 8,284,664 B1 | 10/2012 | Aybay et al. |
| 8,301,746 B2 | 10/2012 | Head et al. |
| 8,345,692 B2 | 1/2013 | Smith |
| 8,406,141 B1 | 3/2013 | Couturier et al. |
| 8,407,413 B1 | 3/2013 | Yucel et al. |
| 8,448,171 B2 | 5/2013 | Donnellan et al. |
| 8,477,610 B2 | 7/2013 | Zuo et al. |
| 8,495,356 B2 | 7/2013 | Ashok et al. |
| 8,495,725 B2 | 7/2013 | Ahn |
| 8,510,469 B2 | 8/2013 | Portolani |
| 8,514,868 B2 | 8/2013 | Hill |
| 8,532,108 B2 | 9/2013 | Li et al. |
| 8,533,687 B1 | 9/2013 | Greifeneder et al. |
| 8,547,974 B1 | 10/2013 | Guruswamy et al. |
| 8,560,639 B2 | 10/2013 | Murphy et al. |
| 8,560,663 B2 | 10/2013 | Baucke et al. |
| 8,589,543 B2 | 11/2013 | Dutta et al. |
| 8,590,050 B2 | 11/2013 | Nagpal et al. |
| 8,611,356 B2 | 12/2013 | Yu et al. |
| 8,612,625 B2 | 12/2013 | Andreis et al. |
| 8,630,291 B2 | 1/2014 | Shaffer et al. |
| 8,639,787 B2 | 1/2014 | Lagergren et al. |
| 8,656,024 B2 | 2/2014 | Krishnan et al. |
| 8,660,129 B1 | 2/2014 | Brendel et al. |
| 8,719,804 B2 | 5/2014 | Jain |
| 8,775,576 B2 | 7/2014 | Hebert et al. |
| 8,797,867 B1 | 8/2014 | Chen et al. |
| 8,805,951 B1 | 8/2014 | Faibish et al. |
| 8,850,002 B1 | 9/2014 | Dickinson et al. |
| 8,850,182 B1 | 9/2014 | Fritz et al. |
| 8,856,339 B2 | 10/2014 | Mestery et al. |
| 8,909,928 B2 | 12/2014 | Ahmad et al. |
| 8,918,510 B2 | 12/2014 | Gmach et al. |
| 8,924,720 B2 | 12/2014 | Raghuram et al. |
| 8,930,747 B2 | 1/2015 | Levijarvi et al. |
| 8,938,775 B1 | 1/2015 | Roth et al. |
| 8,959,526 B2 | 2/2015 | Kansal et al. |
| 8,977,754 B2 | 3/2015 | Curry, Jr. et al. |
| 9,009,697 B2 | 4/2015 | Breiter et al. |
| 9,015,324 B2 | 4/2015 | Jackson |
| 9,043,439 B2 | 5/2015 | Bicket et al. |
| 9,049,115 B2 | 6/2015 | Rajendran et al. |
| 9,063,789 B2 | 6/2015 | Beaty et al. |
| 9,065,727 B1 | 6/2015 | Liu et al. |
| 9,075,649 B1 | 7/2015 | Bushman et al. |
| 9,130,846 B1 | 9/2015 | Szabo et al. |
| 9,164,795 B1 | 10/2015 | Vincent |
| 9,167,050 B2 | 10/2015 | Durazzo et al. |
| 9,201,701 B2 | 12/2015 | Boldyrev et al. |
| 9,201,704 B2 | 12/2015 | Chang et al. |
| 9,203,784 B2 | 12/2015 | Chang et al. |
| 9,223,634 B2 | 12/2015 | Chang et al. |
| 9,244,776 B2 | 1/2016 | Koza et al. |
| 9,251,114 B1 | 2/2016 | Ancin et al. |
| 9,264,478 B2 | 2/2016 | Hon et al. |
| 9,294,408 B1 | 3/2016 | Dickinson et al. |
| 9,313,048 B2 | 4/2016 | Chang et al. |
| 9,361,192 B2 | 6/2016 | Smith et al. |
| 9,379,982 B1 | 6/2016 | Krishna et al. |
| 9,380,075 B2 | 6/2016 | He et al. |
| 9,432,245 B1 | 8/2016 | Sorenson, III et al. |
| 9,432,294 B1 | 8/2016 | Sharma et al. |
| 9,444,744 B1 | 9/2016 | Sharma et al. |
| 9,473,365 B2 | 10/2016 | Melander et al. |
| 9,503,530 B1 | 11/2016 | Niedzielski |
| 9,558,078 B2 | 1/2017 | Farlee et al. |
| 9,571,570 B1 | 2/2017 | Mutnuru |
| 9,613,078 B2 | 4/2017 | Vermeulen et al. |
| 9,626,208 B2 | 4/2017 | Cao et al. |
| 9,628,471 B1 | 4/2017 | Sundaram et al. |
| 9,658,876 B2 | 5/2017 | Chang et al. |
| 9,692,802 B2 | 6/2017 | Bicket et al. |
| 9,705,778 B2 | 7/2017 | Bragstad et al. |
| 9,755,858 B2 | 9/2017 | Bagepalli et al. |
| 2001/0055303 A1 | 12/2001 | Horton et al. |
| 2002/0073337 A1 | 6/2002 | Ioele et al. |
| 2002/0143928 A1 | 10/2002 | Maltz et al. |
| 2002/0166117 A1 | 11/2002 | Abrams et al. |
| 2002/0174216 A1 | 11/2002 | Shorey et al. |
| 2003/0018591 A1 | 1/2003 | Komisky |
| 2003/0056001 A1 | 3/2003 | Mate et al. |
| 2003/0228585 A1 | 12/2003 | Inoko et al. |
| 2004/0004941 A1 | 1/2004 | Malan et al. |
| 2004/0034702 A1 | 2/2004 | He |
| 2004/0088542 A1 | 5/2004 | Daude et al. |
| 2004/0095237 A1 | 5/2004 | Chen et al. |
| 2004/0131059 A1 | 7/2004 | Ayyakad et al. |
| 2004/0197079 A1 | 10/2004 | Latvala et al. |
| 2004/0264481 A1 | 12/2004 | Darling et al. |
| 2005/0060418 A1 | 3/2005 | Sorokopud |
| 2005/0125424 A1 | 6/2005 | Herriott et al. |
| 2006/0062187 A1 | 3/2006 | Rune |
| 2006/0104286 A1 | 5/2006 | Cheriton |
| 2006/0126665 A1 | 6/2006 | Ward et al. |
| 2006/0146825 A1 | 7/2006 | Hofstaedter et al. |
| 2006/0155875 A1 | 7/2006 | Cheriton |
| 2006/0168338 A1 | 7/2006 | Bruegl et al. |
| 2006/0233106 A1 | 10/2006 | Achlioptas et al. |
| 2007/0174663 A1 | 7/2007 | Crawford et al. |
| 2007/0223487 A1 | 9/2007 | Kajekar et al. |
| 2007/0242830 A1 | 10/2007 | Conrado et al. |
| 2008/0005293 A1 | 1/2008 | Bhargava et al. |
| 2008/0080524 A1 | 4/2008 | Tsushima et al. |
| 2008/0084880 A1 | 4/2008 | Dharwadkar |
| 2008/0165778 A1 | 7/2008 | Ertemalp |
| 2008/0198752 A1 | 8/2008 | Fan et al. |
| 2008/0198858 A1 | 8/2008 | Townsley et al. |
| 2008/0201711 A1 | 8/2008 | Amir Husain |
| 2008/0235755 A1 | 9/2008 | Blaisdell et al. |
| 2009/0006527 A1 | 1/2009 | Gingell, Jr. et al. |
| 2009/0019367 A1 | 1/2009 | Cavagnari et al. |
| 2009/0031312 A1 | 1/2009 | Mausolf et al. |
| 2009/0083183 A1 | 3/2009 | Rao et al. |
| 2009/0138763 A1 | 5/2009 | Arnold |
| 2009/0177775 A1 | 7/2009 | Radia et al. |

(56) References Cited

U.S. PATENT DOCUMENTS

| | | |
|---|---|---|
| 2009/0178058 A1 | 7/2009 | Stillwell, III et al. |
| 2009/0182874 A1 | 7/2009 | Morford et al. |
| 2009/0265468 A1 | 10/2009 | Annambhotla et al. |
| 2009/0265753 A1 | 10/2009 | Anderson et al. |
| 2009/0293056 A1 | 11/2009 | Ferris |
| 2009/0300608 A1 | 12/2009 | Ferris et al. |
| 2009/0313562 A1 | 12/2009 | Appleyard et al. |
| 2009/0323706 A1 | 12/2009 | Germain et al. |
| 2009/0328031 A1 | 12/2009 | Pouyadou et al. |
| 2010/0036903 A1 | 2/2010 | Ahmad et al. |
| 2010/0042720 A1 | 2/2010 | Stienhans et al. |
| 2010/0061250 A1 | 3/2010 | Nugent |
| 2010/0115341 A1 | 5/2010 | Baker et al. |
| 2010/0131765 A1 | 5/2010 | Bromley et al. |
| 2010/0149966 A1 | 6/2010 | Achlioptas et al. |
| 2010/0191783 A1 | 7/2010 | Mason et al. |
| 2010/0192157 A1 | 7/2010 | Jackson et al. |
| 2010/0205601 A1 | 8/2010 | Abbas et al. |
| 2010/0211782 A1 | 8/2010 | Auradkar et al. |
| 2010/0293270 A1 | 11/2010 | Augenstein et al. |
| 2010/0318609 A1 | 12/2010 | Lahiri et al. |
| 2010/0325199 A1 | 12/2010 | Park et al. |
| 2010/0325441 A1 | 12/2010 | Laurie et al. |
| 2010/0333116 A1 | 12/2010 | Prahlad et al. |
| 2011/0016214 A1 | 1/2011 | Jackson |
| 2011/0035754 A1 | 2/2011 | Srinivasan |
| 2011/0055396 A1 | 3/2011 | Dehaan |
| 2011/0055398 A1 | 3/2011 | Dehaan et al. |
| 2011/0055470 A1 | 3/2011 | Portolani |
| 2011/0072489 A1 | 3/2011 | Parann-Nissany |
| 2011/0075667 A1 | 3/2011 | Li et al. |
| 2011/0110382 A1 | 5/2011 | Jabr et al. |
| 2011/0116443 A1 | 5/2011 | Yu et al. |
| 2011/0126099 A1 | 5/2011 | Anderson et al. |
| 2011/0138055 A1 | 6/2011 | Daly et al. |
| 2011/0145413 A1 | 6/2011 | Dawson et al. |
| 2011/0145657 A1 | 6/2011 | Bishop et al. |
| 2011/0173303 A1 | 7/2011 | Rider |
| 2011/0185063 A1 | 7/2011 | Head et al. |
| 2011/0185065 A1 | 7/2011 | Stanisic et al. |
| 2011/0206052 A1 | 8/2011 | Tan et al. |
| 2011/0213966 A1 | 9/2011 | Fu et al. |
| 2011/0219434 A1 | 9/2011 | Betz et al. |
| 2011/0231715 A1 | 9/2011 | Kunii et al. |
| 2011/0231899 A1 | 9/2011 | Pulier et al. |
| 2011/0239039 A1 | 9/2011 | Dieffenbach et al. |
| 2011/0252327 A1 | 10/2011 | Awasthi et al. |
| 2011/0261811 A1 | 10/2011 | Battestilli et al. |
| 2011/0261828 A1 | 10/2011 | Smith |
| 2011/0276675 A1 | 11/2011 | Singh et al. |
| 2011/0276951 A1 | 11/2011 | Jain |
| 2011/0283013 A1 | 11/2011 | Grosser et al. |
| 2011/0295998 A1 | 12/2011 | Ferris et al. |
| 2011/0305149 A1 | 12/2011 | Scott et al. |
| 2011/0307531 A1 | 12/2011 | Gaponenko et al. |
| 2011/0320870 A1 | 12/2011 | Kenigsberg et al. |
| 2012/0005724 A1 | 1/2012 | Lee |
| 2012/0036234 A1 | 2/2012 | Staats et al. |
| 2012/0054367 A1 | 3/2012 | Ramakrishnan et al. |
| 2012/0072318 A1 | 3/2012 | Akiyama et al. |
| 2012/0072578 A1 | 3/2012 | Alam |
| 2012/0072581 A1 | 3/2012 | Tung et al. |
| 2012/0072985 A1 | 3/2012 | Davne et al. |
| 2012/0072992 A1 | 3/2012 | Arasaratnam et al. |
| 2012/0084445 A1 | 4/2012 | Brock et al. |
| 2012/0084782 A1 | 4/2012 | Chou et al. |
| 2012/0096134 A1 | 4/2012 | Suit |
| 2012/0102193 A1 | 4/2012 | Rathore et al. |
| 2012/0102199 A1 | 4/2012 | Hopmann et al. |
| 2012/0131174 A1 | 5/2012 | Ferris et al. |
| 2012/0137215 A1 | 5/2012 | Kawara |
| 2012/0158967 A1 | 6/2012 | Sedayao et al. |
| 2012/0159097 A1 | 6/2012 | Jennas, II et al. |
| 2012/0167094 A1 | 6/2012 | Suit |
| 2012/0173710 A1 | 7/2012 | Rodriguez |
| 2012/0179909 A1 | 7/2012 | Sagi et al. |
| 2012/0180044 A1 | 7/2012 | Donnellan et al. |
| 2012/0182891 A1 | 7/2012 | Lee et al. |
| 2012/0185913 A1 | 7/2012 | Martinez et al. |
| 2012/0192016 A1 | 7/2012 | Gotesdyner et al. |
| 2012/0192075 A1 | 7/2012 | Ebtekar et al. |
| 2012/0201135 A1 | 8/2012 | Ding et al. |
| 2012/0214506 A1 | 8/2012 | Skaaksrud et al. |
| 2012/0222106 A1 | 8/2012 | Kuehl |
| 2012/0236716 A1 | 9/2012 | Anbazhagan et al. |
| 2012/0240113 A1 | 9/2012 | Hur |
| 2012/0265976 A1 | 10/2012 | Spiers et al. |
| 2012/0272025 A1 | 10/2012 | Park et al. |
| 2012/0281706 A1 | 11/2012 | Agarwal et al. |
| 2012/0281708 A1 | 11/2012 | Chauhan et al. |
| 2012/0290647 A1 | 11/2012 | Ellison et al. |
| 2012/0297238 A1 | 11/2012 | Watson et al. |
| 2012/0311106 A1 | 12/2012 | Morgan |
| 2012/0311568 A1 | 12/2012 | Jansen |
| 2012/0324092 A1 | 12/2012 | Brown et al. |
| 2012/0324114 A1 | 12/2012 | Dutta et al. |
| 2013/0003567 A1 | 1/2013 | Gallant et al. |
| 2013/0013248 A1 | 1/2013 | Brugler et al. |
| 2013/0036213 A1 | 2/2013 | Hasan et al. |
| 2013/0044636 A1 | 2/2013 | Koponen et al. |
| 2013/0066940 A1 | 3/2013 | Shao |
| 2013/0080509 A1 | 3/2013 | Wang |
| 2013/0080624 A1 | 3/2013 | Nagai et al. |
| 2013/0091557 A1 | 4/2013 | Gurrapu |
| 2013/0097601 A1 | 4/2013 | Podvratnik et al. |
| 2013/0104140 A1 | 4/2013 | Meng et al. |
| 2013/0111540 A1 | 5/2013 | Sabin |
| 2013/0117337 A1 | 5/2013 | Dunham |
| 2013/0124712 A1 | 5/2013 | Parker |
| 2013/0125124 A1 | 5/2013 | Kempf et al. |
| 2013/0138816 A1 | 5/2013 | Kuo et al. |
| 2013/0144978 A1 | 6/2013 | Jain et al. |
| 2013/0152076 A1 | 6/2013 | Patel |
| 2013/0152175 A1 | 6/2013 | Hromoko et al. |
| 2013/0159097 A1 | 6/2013 | Schory et al. |
| 2013/0159496 A1 | 6/2013 | Hamilton et al. |
| 2013/0160008 A1 | 6/2013 | Cawlfield et al. |
| 2013/0162753 A1 | 6/2013 | Hendrickson et al. |
| 2013/0169666 A1 | 7/2013 | Pacheco et al. |
| 2013/0179941 A1 | 7/2013 | McGloin et al. |
| 2013/0182712 A1 | 7/2013 | Aguayo et al. |
| 2013/0185433 A1 | 7/2013 | Zhu et al. |
| 2013/0191106 A1 | 7/2013 | Kephart et al. |
| 2013/0198374 A1 | 8/2013 | Zalmanovitch et al. |
| 2013/0201989 A1 | 8/2013 | Hu et al. |
| 2013/0204849 A1 | 8/2013 | Chacko |
| 2013/0219405 A1 | 8/2013 | Lee et al. |
| 2013/0232491 A1 | 9/2013 | Radhakrishnan et al. |
| 2013/0246588 A1 | 9/2013 | Borowicz et al. |
| 2013/0250770 A1 | 9/2013 | Zou et al. |
| 2013/0254415 A1 | 9/2013 | Fullen et al. |
| 2013/0262347 A1 | 10/2013 | Dodson |
| 2013/0283364 A1 | 10/2013 | Chang et al. |
| 2013/0297769 A1 | 11/2013 | Chang et al. |
| 2013/0318240 A1 | 11/2013 | Hebert et al. |
| 2013/0318546 A1 | 11/2013 | Kothuri et al. |
| 2013/0339949 A1 | 12/2013 | Spiers et al. |
| 2014/0006481 A1 | 1/2014 | Frey et al. |
| 2014/0006535 A1 | 1/2014 | Reddy |
| 2014/0006585 A1 | 1/2014 | Dunbar et al. |
| 2014/0040473 A1 | 2/2014 | Ho et al. |
| 2014/0040883 A1 | 2/2014 | Tompkins |
| 2014/0052877 A1 | 2/2014 | Mao |
| 2014/0056146 A1 | 2/2014 | Hu et al. |
| 2014/0059310 A1 | 2/2014 | Du et al. |
| 2014/0074850 A1 | 3/2014 | Noel et al. |
| 2014/0075048 A1 | 3/2014 | Yuksel et al. |
| 2014/0075108 A1 | 3/2014 | Dong et al. |
| 2014/0075357 A1 | 3/2014 | Flores et al. |
| 2014/0075501 A1 | 3/2014 | Srinivasan et al. |
| 2014/0089727 A1 | 3/2014 | Cherkasova et al. |
| 2014/0098762 A1 | 4/2014 | Ghai et al. |
| 2014/0108985 A1 | 4/2014 | Scott et al. |
| 2014/0122560 A1 | 5/2014 | Ramey et al. |

(56) References Cited

U.S. PATENT DOCUMENTS

| | | |
|---|---|---|
| 2014/0136779 A1 | 5/2014 | Guha et al. |
| 2014/0140211 A1 | 5/2014 | Chandrasekaran et al. |
| 2014/0141720 A1 | 5/2014 | Princen et al. |
| 2014/0156557 A1 | 6/2014 | Zeng et al. |
| 2014/0164486 A1 | 6/2014 | Ravichandran et al. |
| 2014/0188825 A1 | 7/2014 | Muthukkaruppan et al. |
| 2014/0189095 A1 | 7/2014 | Lindberg et al. |
| 2014/0189125 A1 | 7/2014 | Amies et al. |
| 2014/0215471 A1 | 7/2014 | Cherkasova |
| 2014/0222953 A1 | 8/2014 | Karve et al. |
| 2014/0229221 A1 | 8/2014 | Shih et al. |
| 2014/0244851 A1 | 8/2014 | Lee |
| 2014/0245298 A1 | 8/2014 | Zhou et al. |
| 2014/0281173 A1 | 9/2014 | Im et al. |
| 2014/0282536 A1 | 9/2014 | Dave et al. |
| 2014/0282611 A1 | 9/2014 | Campbell et al. |
| 2014/0282889 A1 | 9/2014 | Ishaya et al. |
| 2014/0289200 A1 | 9/2014 | Kato |
| 2014/0295831 A1 | 10/2014 | Karra et al. |
| 2014/0297569 A1 | 10/2014 | Clark et al. |
| 2014/0297835 A1 | 10/2014 | Buys |
| 2014/0310391 A1 | 10/2014 | Sorenson, III et al. |
| 2014/0310417 A1 | 10/2014 | Sorenson, III et al. |
| 2014/0310418 A1 | 10/2014 | Sorenson, III et al. |
| 2014/0314078 A1 | 10/2014 | Jilani |
| 2014/0317261 A1 | 10/2014 | Shatzkamer et al. |
| 2014/0321278 A1 | 10/2014 | Cafarelli et al. |
| 2014/0330976 A1 | 11/2014 | van Bemmel |
| 2014/0330977 A1 | 11/2014 | van Bemmel |
| 2014/0334488 A1 | 11/2014 | Guichard et al. |
| 2014/0362682 A1 | 12/2014 | Guichard et al. |
| 2014/0365680 A1 | 12/2014 | van Bemmel |
| 2014/0366155 A1 | 12/2014 | Chang et al. |
| 2014/0369204 A1 | 12/2014 | Anand et al. |
| 2014/0372567 A1 | 12/2014 | Ganesh et al. |
| 2014/0379938 A1 | 12/2014 | Bosch et al. |
| 2015/0033086 A1 | 1/2015 | Sasturkar et al. |
| 2015/0043576 A1 | 2/2015 | Dixon et al. |
| 2015/0052247 A1 | 2/2015 | Threefoot et al. |
| 2015/0052517 A1 | 2/2015 | Raghu et al. |
| 2015/0058382 A1 | 2/2015 | St. Laurent et al. |
| 2015/0058459 A1 | 2/2015 | Amendjian et al. |
| 2015/0071285 A1 | 3/2015 | Kumar et al. |
| 2015/0085870 A1 | 3/2015 | Narasimha et al. |
| 2015/0089082 A1 | 3/2015 | Patwardhan et al. |
| 2015/0100471 A1 | 4/2015 | Curry, Jr. et al. |
| 2015/0103827 A1 | 4/2015 | Quinn et al. |
| 2015/0106802 A1 | 4/2015 | Ivanov et al. |
| 2015/0106805 A1 | 4/2015 | Melander et al. |
| 2015/0117199 A1 | 4/2015 | Chinnaiah Sankaran et al. |
| 2015/0117458 A1 | 4/2015 | Gurkan et al. |
| 2015/0120914 A1 | 4/2015 | Wada et al. |
| 2015/0124622 A1 | 5/2015 | Kovvali et al. |
| 2015/0138973 A1 | 5/2015 | Kumar et al. |
| 2015/0143366 A1* | 5/2015 | Suragi Math ......... G06F 9/5072 718/1 |
| 2015/0178133 A1 | 6/2015 | Phelan et al. |
| 2015/0189009 A1 | 7/2015 | van Bemmel |
| 2015/0215819 A1 | 7/2015 | Bosch et al. |
| 2015/0227405 A1 | 8/2015 | Jan et al. |
| 2015/0242204 A1 | 8/2015 | Hassine et al. |
| 2015/0249709 A1 | 9/2015 | Teng et al. |
| 2015/0263901 A1 | 9/2015 | Kumar et al. |
| 2015/0280980 A1 | 10/2015 | Bitar |
| 2015/0281067 A1 | 10/2015 | Wu |
| 2015/0281113 A1 | 10/2015 | Siciliano et al. |
| 2015/0309908 A1 | 10/2015 | Pearson et al. |
| 2015/0319063 A1 | 11/2015 | Zourzouvillys et al. |
| 2015/0326524 A1 | 11/2015 | Tankala et al. |
| 2015/0339210 A1 | 11/2015 | Kopp et al. |
| 2015/0358850 A1 | 12/2015 | La Roche, Jr. et al. |
| 2015/0365324 A1 | 12/2015 | Kumar et al. |
| 2015/0373108 A1 | 12/2015 | Fleming et al. |
| 2016/0011925 A1 | 1/2016 | Kulkarni et al. |
| 2016/0013990 A1 | 1/2016 | Kulkarni et al. |
| 2016/0026684 A1 | 1/2016 | Mukherjee et al. |
| 2016/0062786 A1 | 3/2016 | Meng et al. |
| 2016/0094389 A1 | 3/2016 | Jain et al. |
| 2016/0094398 A1 | 3/2016 | Choudhury et al. |
| 2016/0094453 A1 | 3/2016 | Jain et al. |
| 2016/0094454 A1 | 3/2016 | Jain et al. |
| 2016/0094455 A1 | 3/2016 | Jain et al. |
| 2016/0094456 A1 | 3/2016 | Jain et al. |
| 2016/0094480 A1 | 3/2016 | Kulkarni et al. |
| 2016/0094643 A1 | 3/2016 | Jain et al. |
| 2016/0099847 A1 | 4/2016 | Melander et al. |
| 2016/0099853 A1 | 4/2016 | Nedeltchev et al. |
| 2016/0099864 A1 | 4/2016 | Akiya et al. |
| 2016/0105393 A1 | 4/2016 | Thakkar et al. |
| 2016/0127184 A1 | 5/2016 | Bursell |
| 2016/0134557 A1 | 5/2016 | Steinder et al. |
| 2016/0156708 A1 | 6/2016 | Jalan et al. |
| 2016/0164780 A1 | 6/2016 | Timmons et al. |
| 2016/0164914 A1 | 6/2016 | Madhav et al. |
| 2016/0182378 A1 | 6/2016 | Basavaraja et al. |
| 2016/0188527 A1 | 6/2016 | Cherian et al. |
| 2016/0234071 A1 | 8/2016 | Nambiar et al. |
| 2016/0239399 A1 | 8/2016 | Babu et al. |
| 2016/0253078 A1 | 9/2016 | Ebtekar et al. |
| 2016/0254968 A1 | 9/2016 | Ebtekar et al. |
| 2016/0261564 A1 | 9/2016 | Foxhoven et al. |
| 2016/0277368 A1 | 9/2016 | Narayanaswamy et al. |
| 2017/0005948 A1 | 1/2017 | Melander et al. |
| 2017/0024260 A1 | 1/2017 | Chandrasekaran et al. |
| 2017/0026294 A1 | 1/2017 | Basavaraja et al. |
| 2017/0026470 A1 | 1/2017 | Bhargava et al. |
| 2017/0041342 A1 | 2/2017 | Efremov et al. |
| 2017/0054659 A1 | 2/2017 | Ergin et al. |
| 2017/0093639 A1* | 3/2017 | Dabbagh ................. H04L 41/16 |
| 2017/0097841 A1 | 4/2017 | Chang et al. |
| 2017/0099188 A1 | 4/2017 | Chang et al. |
| 2017/0104755 A1 | 4/2017 | Arregoces et al. |
| 2017/0147297 A1 | 5/2017 | Krishnamurthy et al. |
| 2017/0149878 A1 | 5/2017 | Mutnuru |
| 2017/0163531 A1 | 6/2017 | Kumar et al. |
| 2017/0171158 A1 | 6/2017 | Hoy et al. |
| 2017/0220365 A1 | 8/2017 | Dow |
| 2017/0264663 A1 | 9/2017 | Bicket et al. |
| 2017/0339070 A1 | 11/2017 | Chang et al. |

FOREIGN PATENT DOCUMENTS

| | | |
|---|---|---|
| CN | 102164091 | 8/2011 |
| CN | 104320342 | 1/2015 |
| CN | 105740084 | 7/2016 |
| EP | 2228719 | 9/2010 |
| EP | 2439637 | 4/2012 |
| EP | 2645253 | 11/2014 |
| KR | 10-2015-0070676 | 5/2015 |
| TW | M394537 | 12/2010 |
| WO | WO 2009/155574 | 12/2009 |
| WO | WO 2010/030915 | 3/2010 |
| WO | WO 2013/158707 | 10/2013 |

OTHER PUBLICATIONS

Amedro, Brian, et al., "An Efficient Framework for Running Applications on Clusters, Grids and Cloud," 2010, 17 pages.

Author Unknown, "5 Benefits of a Storage Gateway in the Cloud," Blog, TwinStrata, Inc., Jul. 25, 2012, XP055141645, 4 pages, https://web.archive.org/web/20120725092619/http://blog.twinstrata.com/2012/07/10//5-benefits-of-a-storage-gateway-in-the-cloud.

Author Unknown, "Joint Cisco and VMWare Solution for Optimizing Virtual Desktop Delivery: Data Center 3.0: Solutions to Accelerate Data Center Virtualization," Cisco Systems, Inc. And VMware, Inc., Sep. 2008, 10 pages.

Author Unknown, "A Look at DeltaCloud: The Multi-Cloud API," Feb. 17, 2012, 4 pages.

Author Unknown, "About Deltacloud," Apache Software Foundation, Aug. 18, 2013, 1 page.

(56) References Cited

OTHER PUBLICATIONS

Author Unknown, "Architecture for Managing Clouds, A White Paper from the Open Cloud Standards Incubator," Version 1.0.0, Document No. DSP-IS0102, Jun. 18, 2010, 57 pages.
Author Unknown, "Cloud Infrastructure Management Interface—Common Information Model (CIMI-CIM)," Document No. DSP0264, Version 1.0.0, Dec. 14, 2012, 21 pages.
Author Unknown, "Cloud Infrastructure Management Interface (CIMI) Primer," Document No. DSP2027, Version 1.0.1, Sep. 12, 2012, 30 pages.
Author Unknown, "cloudControl Documentation," Aug. 25, 2013, 14 pages.
Author Unknown, "Interoperable Clouds, A White Paper from the Open Cloud Standards Incubator," Version 1.0.0, Document No. DSP-IS0101, Nov. 11, 2009, 21 pages.
Author Unknown, "Microsoft Cloud Edge Gateway (MCE) Series Appliance," Iron Networks, Inc., 2014, 4 pages.
Author Unknown, "Open Data Center Alliance Usage: Virtual Machine (VM) Interoperability in a Hybrid Cloud Environment Rev. 1.2," Open Data Center Alliance, Inc., 2013, 18 pages.
Author Unknown, "Real-Time Performance Monitoring on Juniper Networks Devices, Tips and Tools for Assessing and Analyzing Network Efficiency," Juniper Networks, Inc., May 2010, 35 pages.
Author Unknown, "Use Cases and Interactions for Managing Clouds, A White Paper from the Open Cloud Standards Incubator," Version 1.0.0, Document No. DSP-ISO0103, Jun. 16, 2010, 75 pages.
Author Unknown, "Apache Ambari Meetup What's New," Hortonworks Inc., Sep. 2013, 28 pages.
Author Unknown, "Introduction," Apache Ambari project, Apache Software Foundation, 2014, 1 page.
Baker, F., "Requirements for IP Version 4 Routers," Jun. 1995, 175 pages, Network Working Group, Cisco Systems.
Beyer, Steffen, "Module "Data::Locations?!"," YAPC::Europe, London, UK,ICA, Sep. 22-24, 2000, XP002742700, 15 pages.
Blanchet, M., "A Flexible Method for Managing the Assignment of Bits of an IPv6 Address Block," Apr. 2003, 8 pages, Network Working Group, Viagnie.
Borovick, Lucinda, et al., "Architecting the Network for the Cloud," IDC White Paper, Jan. 2011, 8 pages.
Bosch, Greg, "Virtualization," last modified Apr. 2012 by B. Davison, 33 pages.
Broadcasters Audience Research Board, "What's Next," http://lwww.barb.co.uk/whats-next, accessed Jul. 22, 2015, 2 pages.
Cisco Systems, Inc. "Best Practices in Deploying Cisco Nexus 1000V Series Switches on Cisco UCS B and C Series Cisco UCS Manager Servers," Cisco White Paper, Apr. 2011, 36 pages, http://www.cisco.com/en/US/prod/collateral/switches/ps9441/ps9902/white_paper_c11-558242.pdf.
Cisco Systems, Inc., "Cisco Unified Network Services: Overcome Obstacles to Cloud-Ready Deployments," Cisco White Paper, Jan. 2011, 6 pages.
Cisco Systems, Inc., "Cisco Intercloud Fabric: Hybrid Cloud with Choice, Consistency, Control and Compliance," Dec. 10, 2014, 22 pages.
Cisco Technology, Inc., "Cisco Expands Videoscape TV Platform Into the Cloud," Jan. 6, 2014, Las Vegas, Nevada, Press Release, 3 pages.
Citrix, "Citrix StoreFront 2.0" White Paper, Proof of Concept Implementation Guide, Citrix Systems, Inc., 2013, 48 pages.
Citrix, "CloudBridge for Microsoft Azure Deployment Guide," 30 pages.
Citrix, "Deployment Practices and Guidelines for NetScaler 10.5 on Amazon Web Services," White Paper, citrix.com, 2014, 14 pages.
CSS Corp, "Enterprise Cloud Gateway (ECG)—Policy driven framework for managing multi-cloud environments," original published on or about Feb. 11, 2012; 1 page; http://www.css-cloud.com/platform/enterprise-cloud-gateway.php.
Fang K., "LISP MAC-EID-TO-RLOC Mapping (LISP based L2VPN)," Network Working Group, Internet Draft, Cisco Systems, Jan. 2012, 12 pages.

Ford, Bryan, et al., Peer-to-Peer Communication Across Network Address Translators, In Usenix Annual Technical Conference, 2005, pp. 179-192.
Gedymin, Adam, "Cloud Computing with an emphasis on Google App Engine," Sep. 2011, 146 pages.
Good, Nathan A., "Use Apache Deltacloud to administer multiple instances with a single API," Dec. 17, 2012, 7 pages.
Herry, William, "Keep It Simple, Stupid: OpenStack nova-scheduler and its algorithm", May 12, 2012, IBM, 12 pages.
Hewlett-Packard Company, "Virtual context management on network devices", Research Disclosure, vol. 564, No. 60, Apr. 1, 2011, Mason Publications, Hampshire, GB, Apr. 1, 2011, 524.
Juniper Networks, Inc., "Recreating Real Application Traffic in Junosphere Lab," Solution Brief, Dec. 2011, 3 pages.
Kenhui, "Musings on Cloud Computing and IT-as-a-Service: [Updated for Havana] Openstack Computer for VSphere Admins, Part 2: Nova-Scheduler and DRS", Jun. 26, 2013, Cloud Architect Musings, 12 pages.
Kolyshkin, Kirill, "Virtualization in Linux," Sep. 1, 2006, XP055141648, 5 pages, https://web.archive.org/web/20070120205111/http://download.openvz.org/doc/openvz-intro.pdf.
Kumar, S., et al., "Infrastructure Service Forwarding for NSH," Service Function Chaining Internet Draft, draft-kumar-sfc-nsh-forwarding-00, Dec. 5, 2015, 10 pages.
Kunz, Thomas, et al., "OmniCloud—The Secure and Flexible Use of Cloud Storage Services," 2014, 30 pages.
Lerach, S.R.O., "Golem," http://www.lerach.cz/en/products/golem, accessed Jul. 22, 2015, 2 pages.
Linthicum, David, "VM Import could be a game changer for hybrid clouds", InfoWorld, Dec. 23, 2010, 4 pages.
Logan, Marcus, "Hybrid Cloud Application Architecture for Elastic Java-Based Web Applications," F5 Deployment Guide Version 1.1, 2016, 65 pages.
Lynch, Sean, "Monitoring cache with Claspin" Facebook Engineering, Sep. 19, 2012, 5 pages.
Meireles, Fernando Miguel Dias, "Integrated Management of Cloud Computing Resources," 2013-2014, 286 pages.
Meraki, "meraki releases industry's first cloud-managed routers," Jan. 13, 2011, 2 pages.
Mu, Shuai, et al., "uLibCloud: Providing High Available and Uniform Accessing to Multiple Cloud Storages," 2012 IEEE, 8 pages.
Naik, Vijay K., et al., "Harmony: A Desktop Grid for Delivering Enterprise Computations," Grid Computing, 2003, Fourth International Workshop on Proceedings, Nov. 17, 2003, pp. 1-11.
Nair, Srijith K. et al., "Towards Secure Cloud Bursting, Brokerage and Aggregation," 2012, 8 pages, www.flexiant.com.
Nielsen, "SimMetry Audience Measurement—Technology." http://www.nielsen-admosphere.eu/products-and-services/simmetry-audience-measurement-technology/, accessed Jul. 22, 2015, 6 pages.
Nielsen, "Television," http://www.nielsen.com/us/en/solutions/measurement/television.html, accessed Jul. 22, 2015, 4 pages.
Open Stack, "Filter Scheduler," updated Dec. 17, 2017, 5 pages, accessed on Dec. 18, 2017, https://docs.openstack.org/nova/latest/user/filter-scheduler.html.
Quinn, P., et al., "Network Service Header," Internet Engineering Task Force Draft, Jul. 3, 2014, 27 pages.
Quinn, P., et al., "Service Function Chaining (SFC) Architecture," Network Working Group, Internet Draft, draft-quinn-sfc-arch-03.txt, Jan. 22, 2014, 21 pages.
Rabadan, J., et al., "Operational Aspects of Proxy-ARP/ND in EVPN Networks," BESS Worksgroup Internet Draft, draft-snr-bess-evpn-proxy-arp-nd-02, Oct. 6, 2015, 22 pages.
Saidi, Ali, et al., "Performance Validation of Network-Intensive Workloads on a Full-System Simulator," Interaction between Operating System and Computer Architecture Workshop, (IOSCA 2005), Austin, Texas, Oct. 2005, 10 pages.
Shunra, "Shunra for HP Software; Enabling Confidence in Application Performance Before Deployment," 2010, 2 pages.
Son, Jungmin, "Automatic decision system for efficient resource selection and allocation in inter-clouds," Jun. 2013, 35 pages.

(56) References Cited

OTHER PUBLICATIONS

Sun, Aobing, et al., "IaaS Public Cloud Computing Platform Scheduling Model and Optimization Analysis," Int. J. Communications, Network and System Sciences, 2011, 4, 803-811, 9 pages.

Szymaniak, Michal, et al., "Latency-Driven Replica Placement", vol. 47 No. 8, IPSJ Journal, Aug. 2006, 12 pages.

Toews, Everett, "Introduction to Apache jclouds," Apr. 7, 2014, 23 pages.

Von Laszewski, Gregor, et al., "Design of a Dynamic Provisioning System for a Federated Cloud and Bare-metal Environment," 2012, 8 pages.

Wikipedia, "Filter (software)", Wikipedia, Feb. 8, 2014, 2 pages, https://en.wikipedia.org/w/index.php?title=Filter_%28software%29&oldid=594544359.

Wikipedia; "Pipeline (Unix)", Wikipedia, May 4, 2014, 4 pages, https://en.wikipedia.org/w/index.php?title=Pipeline2/028Unix%29&oldid=606980114.

Ye, Xianglong, et al., "A Novel Blocks Placement Strategy for Hadoop," 2012 IEEE/ACTS 11th International Conference on Computer and Information Science, 2012 IEEE, 5 pages.

\* cited by examiner

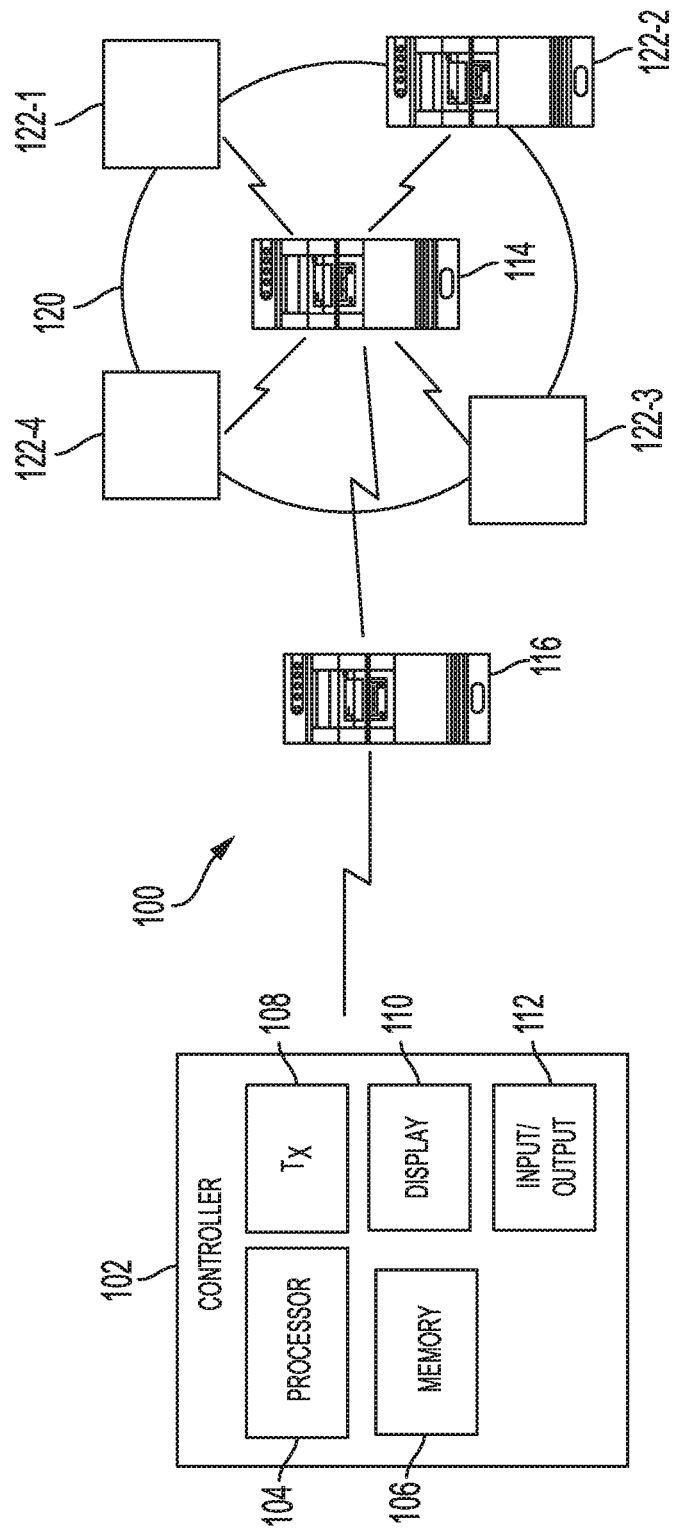

SYSTEM AND METHOD FOR RESOURCE PLACEMENT ACROSS CLOUDS FOR DATA INTENSIVE WORKLOADS

The present technology pertains to a system and method of determining a point of delivery (POD) device or network component for workload placement in a multi-cloud environment.

BACKGROUND

In multi-cloud environments that offer services such as server less computing services, data intensive workloads are often implemented over multiple devices, each located within a different cloud (that is possibly located in different geographical locations). Typically, there is a cost function (expressed either in terms of resource utilization and/or monetary value) associated with transitioning workloads from one network component in one cloud environment to another network component in another cloud environment. Accordingly, there is a need for optimizing workload placement across various clouds in order to minimize transit costs and provide optimal performance.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIGS. 1A-D illustrate example network environments and architectures, according to one aspect of the present disclosure:

DETAILED DESCRIPTION

Figure 1B:
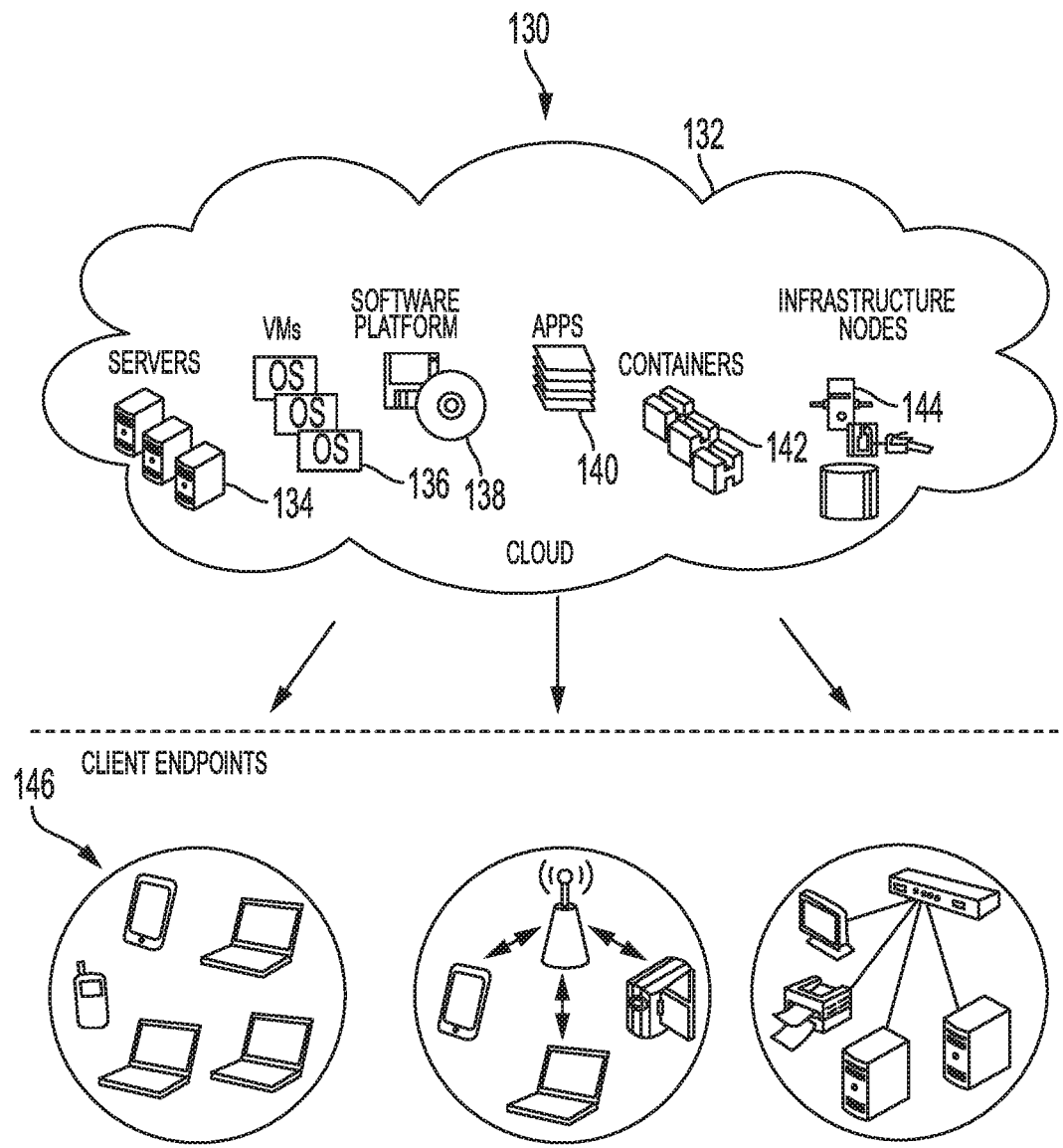

Various examples of the disclosure are discussed in detail below. While specific implementations are discussed, it should be understood that this is done for illustration purposes only. A person skilled in the relevant art will recognize that other components and configurations may be used without parting from the spirit and scope of the disclosure.

References to one or an example embodiment in the present disclosure can be, but not necessarily are, references to the same example embodiment; and, such references mean at least one of the example embodiments.

Reference to "one example embodiment" or "an example embodiment" means that a particular feature, structure, or characteristic described in connection with the example embodiment is included in at least one example of the disclosure. The appearances of the phrase "in one example embodiment" in various places in the specification are not necessarily all referring to the same example embodiment, nor are separate or alternative example embodiments mutually exclusive of other example embodiments. Moreover, various features are described which may be exhibited by some example embodiments and not by others. Similarly, various features are described which may be features for some example embodiments but not other example embodiments.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various examples given in this specification.

Without intent to limit the scope of the disclosure, examples of instruments, apparatus, methods and their related results according to examples of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected." or "coupled," to another element, it can be directly connected or coupled to the other element or intervening elements may be present. By contrast, when an element is referred to as being "directly connected." or "directly coupled," to another element, there are no intervening elements present. Other words used to describe the relationship between elements should be interpreted in a like fashion (e.g., "between," versus "directly between," "adjacent." versus "directly adjacent," etc.).

The terminology used herein is for the purpose of describing particular examples only and is not intended to be limiting. As used herein, the singular forms "a", "an", and "the" are intended to include the plural forms as well, unless the context clearly indicates otherwise. It will be further understood that the terms "comprises". "comprising,". "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of examples. However, it will be understood by one of ordinary skill in the art that examples may be practiced without these specific details. For example, systems may be shown in block diagrams so as not to obscure the examples in unnecessary detail. In other instances, well-known processes, structures and techniques may be shown without unnecessary detail in order to avoid obscuring examples.

In the following description, illustrative examples will be described with reference to acts and symbolic representations of operations (e.g., in the form of flow charts, flow diagrams, data flow diagrams, structure diagrams, block diagrams, etc.) that may be implemented as program services or functional processes include routines, programs, objects, components, data structures, etc., that perform particular tasks or implement particular abstract data types and may be implemented using hardware at network elements. Non-limiting examples of such hardware may include one or more Central Processing Units (CPUs), digital signal processors (DSPs), application-specific-integrated-circuits, field programmable gate arrays (FPGAs) computers or the like.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

In one aspect of the present disclosure, a computer-implemented method for selecting a network node to implement a network function includes determining a first amount of data for transitioning from performing a first function on input data to performing a second function on a first outcome of the first function; determining a second amount of data for transitioning from performing the second function on the first outcome to performing a third function on a second outcome of the second function; determining a processing capacity for each of one or more network nodes on which the first function and the third function are implemented; and selecting the network node for implementing the second function based on the first amount of data, the second amount of data, and the processing capacity for each of the network nodes.

In one aspect of the present disclosure, a system for selecting a network node to implement a network function includes memory configured to store computer-readable instructions therein and one or more processors configured to execute the computer-readable instructions to perform functions including determining a first amount of data for transitioning from performing a first function on input data to performing a second function on a first outcome of the first function; determining a second amount of data for transitioning from performing the second function on the first outcome to performing a third function on a second outcome of the second function: determining a processing capacity for each of one or more network nodes on which the first function and the third function are implemented; and selecting the network node for implementing the second function based on the first amount of data, the second amount of data, and the processing capacity for each of the network nodes.

In one aspect of the present disclosure, one or more non-transitory computer-readable medium have computer-readable instructions stored therein, which when executed by one or more processors, cause the one or more processors to select a network node for implementing a network function by performing the functions of determining a first amount of data for transitioning from performing a first function on input data to performing a second function on a first outcome of the first function; determining a second amount of data for transitioning from performing the second function on the first outcome to performing a third function on a second outcome of the second function; determining a processing capacity for each of one or more network nodes on which the first function and the third function are implemented; and selecting the network node for implementing the second function based on the first amount of data, the second amount of data, and the processing capacity for each of the network nodes.

DESCRIPTION

The disclosed technology addresses the need in the art for determining a proper placement of workloads (resources) across network components corresponding to different clouds in order to increase efficiency and processing speed of underlying workloads as well as to reduce various costs associated with inter-cloud migration/transition/transfer of workloads and associated data.

The disclosure begins with a description of example network environments and architectures which can be implemented for distributed streaming systems, as illustrated in FIGS. 1A-D and 2.

The disclosure begins with a description of example network environments and architectures, as illustrated in FIGS. 1A-D.

FIG. 1A illustrates an example system, according to one aspect of the present disclosure. System (network) 100 of FIG. 1A includes a controller 102 and a distributed streaming system 120. Controller 102 can be an application, a software container, a virtual machine, a service chain, a virtual function(s), etc. Controller 102 can run on one or more devices or servers having components such as one or more processors (e.g., processor 104), one or more memories (e.g., memory 106), a transceiver 108, a display device (display) 110 and an input/output device (input/output or input device) 112. Processor 104 can be configured to execute computer-readable instructions stored on memory 106 for performing the functionalities which will be described below with reference to FIGS. 5-6. Throughout the disclosure, controller 102 can be referred to as system management component 102, management device 102, device 102 and/or system controller 102.

Transceiver 108 can be any known or to be developed receiver and transmitter through which controller 102 can send and receive information to and from external components such as components of distributed streaming system 120.

Network operators and controllers (operational management component) can use display 110 to view data corresponding to status and/or management of operation of distributed streaming system 120, as will be described below. Display 110 can be any type of know or to be developed display such as a liquid crystal display (LCD), a light emitting diode display (LED), etc.

Input device 112 can be any known or to be developed input device including, but not limited to, a keyboard, a touch-based input device, etc. In one example, display 110 and input device 112 can be the same when display 110 is a touch enabled device capable of receiving inputs. Network managers and operators can provide appropriate commands for monitoring and management of distributed streaming system 120, via input device 112.

Controller 102 can communicate with various components of distributed streaming system 120 via any known or to be developed wireless communications and/or wired communications mean. For example, controller 102 can access and obtain information (and/or send information) to each component of distributed streaming system 120 via a network such as a local area wireless network (LAN), a virtual local area network (vLAN) and/or any other type of, known or to be developed, network through which controller 102 can communicate with each component of distributed streaming system 120.

In one aspect, controller 102 can be any known or to be developed electronic device including, but not limited to, a laptop, a desktop computer, a mobile device, a handheld device, etc.

Distributed streaming system 120 can be any known, or to be developed, distributed streaming system where various components thereof such as components 122-1, 122-2, 122-3 and 122-4 communicate with one another to provide a streaming service to users in a distributed fashion. Hereinafter, components 122-1, 122-2, 122-3 and 122-4 may simply be referred to as components 122 or nodes 122. While throughout the present disclosure, distributed streaming system 120 is provided as an example, the present disclosure is not limited thereto and can encompass and be applicable to any distributed systems that can be abstracted into a Directed Acyclic Graph (DAG) where each vertex can denote an information/message, and information/messages are passed through edges in certain directions. Other examples of distributed systems include a distributed sensor network where signals are propagated from sensor to sensor, a multi-component data processing system where each component receives and processes chunks of data and pass it to the next component(s).

Each one of components 122 can be any know or to be developed electronic device capable of communicating remotely with other devices such as other components 122. For example, each component 122 can be a mobile device, a laptop, a desktop computer, a switch, a data center comprising one or more servers, etc. For example, while some of components 122 can be end user devices or hosts, other ones of components 122 can be servers that facilitate the streaming services provided by distributed streaming system 120.

Furthermore, distributed streaming system 120 can have a server 114 acting as a collector of information (data) for other components (end user devices) in the system. Examples of data include device metrics such as device ID, an associated timestamp, device IP address, device throughput, device latency, memory and processing speed characteristics, etc.

In one example, system 100 further includes one or more feedback servers 116, where various types of data (to be used by controller 102) on components 122 can be collected and saved. In another example, system 100 does not include any feedback servers and instead can directly receive (through push or pull operations) the intended data (which will be described below) from each component 122.

While certain components are illustrated as part of system 100, system 100 is not limited thereto and may include any other type of component (e.g., additional servers, access points, sensors, etc.) for providing services to clients and end users.

Distributed streaming system 120 can be a cloud based system, where each component thereof is located in a different geographical location but can communicate with one another to form distributed streaming system 120 (e.g., over the Internet).

Examples of streaming services provided via distributed streaming system 120 can include, but is not limited to, live video and/or audio content such as a speech, a concert, a TV program, music, etc. These examples, along with many other examples, such as signal image and video processing applications and services can be referred to data-intensive services or workloads.

Operations of distributed streaming system 120 for delivering a streaming service to end users can be based on any know or to be developed method for doing so, by for example, continuously processing a stream of text, graphs, videos, audios, time series data, etc. in real time or near real time or periodically. The system 100 of FIG. 1A utilizes client/server based architectures. In other examples, system 100 can be implemented as a cloud or fog computing architecture.

FIG. 1B illustrates a diagram of an example cloud computing architecture (network) 130. The architecture can include a cloud 132. The cloud 132 can include one or more private clouds, public clouds, and/or hybrid clouds. Moreover, the cloud 132 can include cloud elements 134-144. The cloud elements 134-144 can include, for example, servers 134, virtual machines (VMs) 136, one or more software platforms 138, applications or services 140, software containers 142, and infrastructure nodes 144. The infrastructure nodes 144 can include various types of nodes, such as compute nodes, storage nodes, network nodes, management systems, etc. In one example, one or more servers 134 can implement the functionalities of controller 102, which will be described below. Alternatively, controller 102 can be a separate component that communicates with components of the cloud computing architecture 130 that function as a distributed streaming system similar to the distributed streaming system 120.

The cloud 132 can provide various cloud computing services via the cloud elements 134-144, such as software as a service (SaaS) (e.g., collaboration services, email services, enterprise resource planning services, content services, communication services, etc.), infrastructure as a service (IaaS) (e.g., security services, networking services, systems management services, etc.), platform as a service (PaaS) (e.g., web services, streaming services, application development services, etc.), function as a service (FaaS), and other types of services such as desktop as a service (DaaS), information technology management as a service (ITaaS), managed software as a service (MSaaS), mobile backend as a service (MBaaS), etc.

The client endpoints 146 can connect with the cloud 132 to obtain one or more specific services from the cloud 132. The client endpoints 146 can communicate with elements 134-144 via one or more public networks (e.g., Internet), private networks, and/or hybrid networks (e.g., virtual private network). The client endpoints 146 can include any device with networking capabilities, such as a laptop computer, a tablet computer, a server, a desktop computer, a smartphone, a network device (e.g., an access point, a router, a switch, etc.), a smart television, a smart car, a sensor, a GPS device, a game system, a smart wearable object (e.g., smartwatch, etc.), a consumer object (e.g., Internet refrigerator, smart lighting system, etc.), a city or transportation system (e.g., traffic control, toll collection system, etc.), an internet of things (IoT) device, a camera, a network printer, a transportation system (e.g., airplane, train, motorcycle, boat, etc.), or any smart or connected object (e.g., smart home, smart building, smart retail, smart glasses, etc.), and so forth.

Figure 1C:
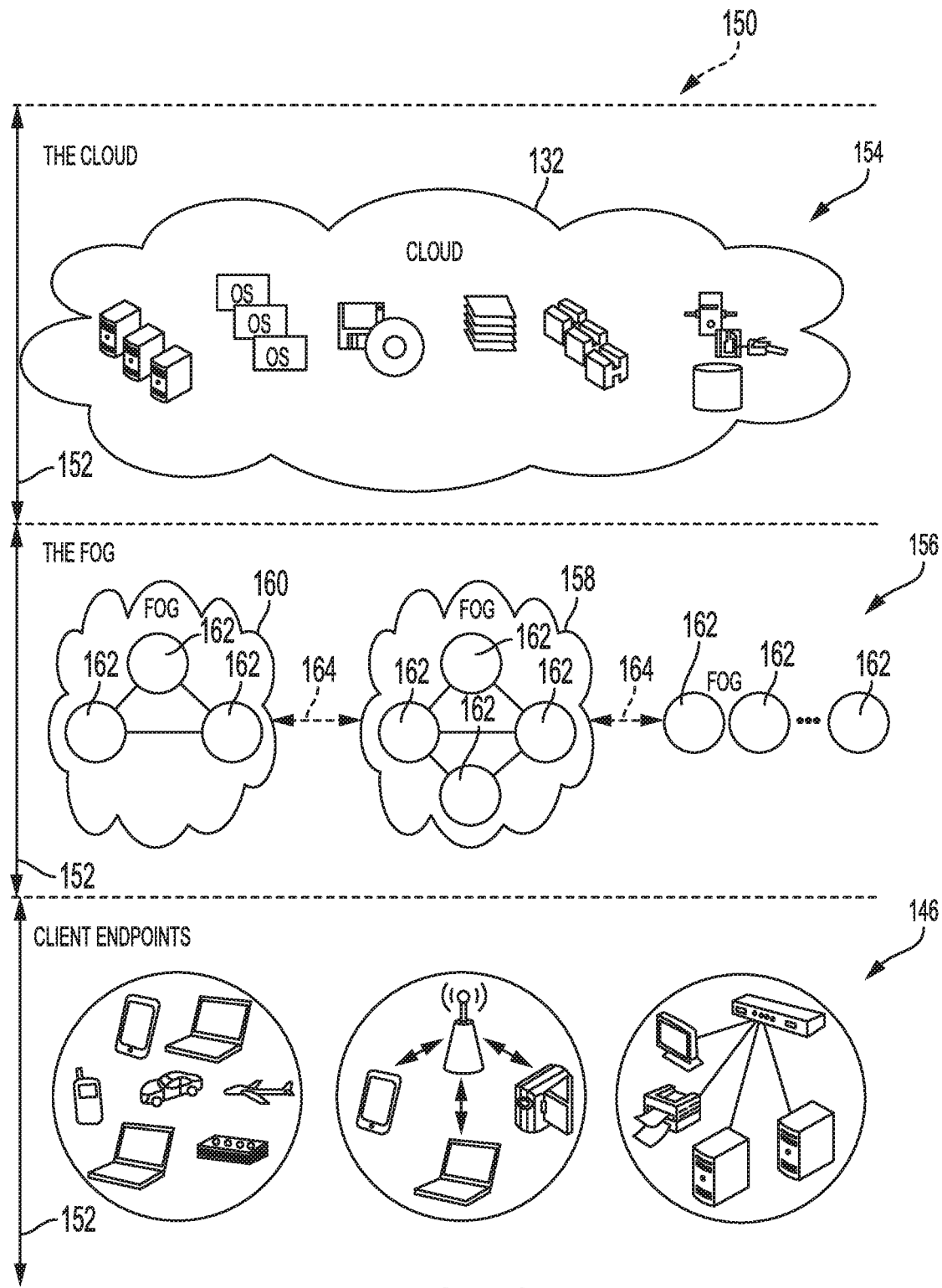

FIG. 1C illustrates a diagram of an example fog computing architecture (network) 150. The fog computing architecture 150 can include the cloud layer 154, which includes the cloud 132 and any other cloud system or environment, the fog layer 156, which includes fog nodes 162 and client endpoints 146. The client endpoints 146 can communicate with the cloud layer 154 and/or the fog layer 156. The architecture 150 can include one or more communication links 152 between the cloud layer 154, the fog layer 156, and the client endpoints 146. Communications can flow up to the cloud layer 154 and/or down to the client endpoints 146.

In one example, one or more servers 134 can implement the functionalities of controller 102, which will be described below. Alternatively, controller 102 can be a separate component that communicates with components of the fog computing architecture 150 that function as a distributed streaming system similar to the distributed streaming system 120.

The fog layer 156 or "the fog" provides the computation, storage and networking capabilities of traditional cloud networks, but closer to the endpoints. The fog can thus extend the cloud 132 to be closer to the client endpoints 146. The fog nodes 162 can be the physical implementation of fog networks. Moreover, the fog nodes 162 can provide local or regional services and/or connectivity to the client endpoints 146. As a result, traffic and/or data can be offloaded from the cloud 132 to the fog layer 156 (e.g., via fog nodes 162). The fog layer 156 can thus provide faster services and/or connectivity to the client endpoints 146, with lower latency, as well as other advantages such as security benefits from keeping the data inside the local or regional network(s).

The fog nodes 162 can include any networked computing devices, such as servers, switches, routers, controllers, cameras, access points, kiosks, gateways, etc. Moreover, the fog nodes 162 can be deployed anywhere with a network connection, such as a factory floor, a power pole, alongside a railway track, in a vehicle, on an oil rig, in an airport, on an aircraft, in a shopping center, in a hospital, in a park, in a parking garage, in a library, etc.

In some configurations, one or more fog nodes 162 can be deployed within fog instances 158, 160. The fog instances 158 and 160 can be local or regional clouds or networks. For example, the fog instances 158 and 160 can be a regional cloud or data center, a local area network, a network of fog nodes 162, etc. In some configurations, one or more fog nodes 162 can be deployed within a network, or as stand-alone or individual nodes, for example. Moreover, one or more of the fog nodes 162 can be interconnected with each other via links 164 in various topologies, including star, ring, mesh or hierarchical arrangements, for example.

In some cases, one or more fog nodes 162 can be mobile fog nodes. The mobile fog nodes can move to different geographic locations, logical locations or networks, and/or fog instances while maintaining connectivity with the cloud layer 154 and/or the endpoints 146. For example, a particular fog node can be placed in a vehicle, such as an aircraft or train, which can travel from one geographic location and/or logical location to a different geographic location and/or logical location. In this example, the particular fog node may connect to a particular physical and/or logical connection point with the cloud layer 154 while located at the starting location and switch to a different physical and/or logical connection point with the cloud layer 154 while located at the destination location. The particular fog node can thus move within particular clouds and/or fog instances and, therefore, serve endpoints from different locations at different times.

Figure 1D:
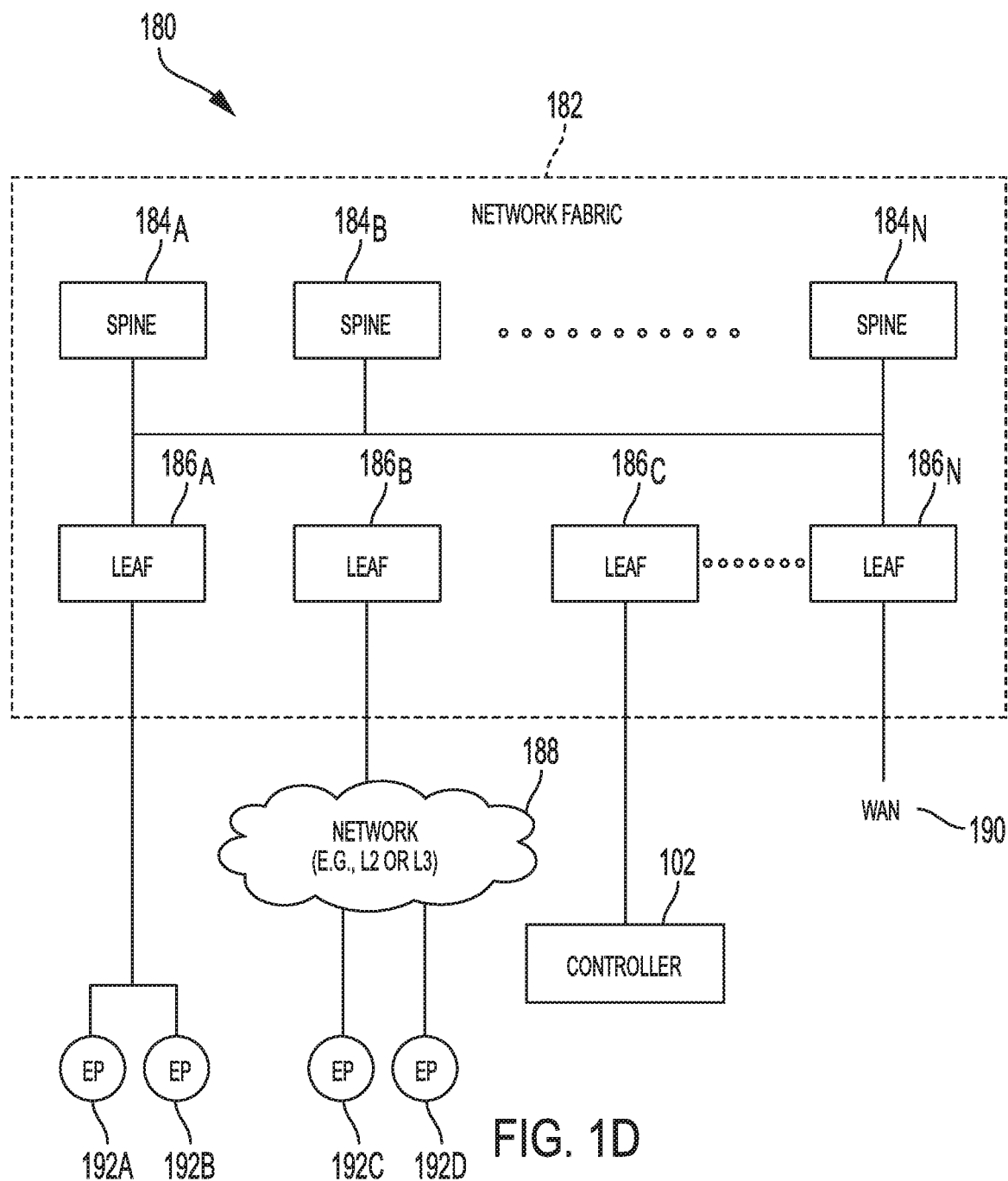

FIG. 1D illustrates a schematic block diagram of an example network architecture (network) 180. In some cases, the architecture 180 can include a data center, which can support and/or host the cloud 132. Moreover, the architecture 180 includes a network fabric 182 with spines 184A, 184B, . . . , 184N (collectively "spines 184") connected to leafs 186A. 186B, 186C, . . . , 186N (collectively "leafs 186") in the network fabric 182. Spines 184 and leafs 186 can be Layer 2 and/or Layer 3 devices, such as switches or routers. For the sake of clarity, they will be referenced herein as spine switches 184 and leaf switches 186.

Spine switches 184 connect to leaf switches 186 in the fabric 182. Leaf switches 186 can include access ports (or non-fabric ports) and fabric ports. Fabric ports can provide uplinks to the spine switches 182, while access ports can provide connectivity for devices, hosts, endpoints. VMs, or external networks to the fabric 182.

Leaf switches 186 can reside at the boundary between the fabric 182 and the tenant or customer space. The leaf switches 186 can route and/or bridge the tenant packets and apply network policies. In some cases, a leaf switch can perform one or more additional functions, such as implementing a mapping cache, sending packets to the proxy function when there is a miss in the cache, encapsulate packets, enforce ingress or egress policies, etc.

Moreover, the leaf switches 186 can contain virtual switching and/or tunneling functionalities, such as a virtual tunnel endpoint (VTEP) function. Thus, leaf switches 186 can connect the fabric 182 to an overlay (e.g., VXLAN network).

Network connectivity in the fabric 182 can flow through the leaf switches 186. The leaf switches 186 can provide servers, resources, endpoints, external networks, containers, or VMs access to the fabric 182, and can connect the leaf switches 186 to each other. The leaf switches 186 can connect applications and/or endpoint groups ("EPGs") to other resources inside or outside of the fabric 182 as well as any external networks.

Endpoints 192A-D (collectively "endpoints 192") can connect to the fabric 182 via leaf switches 186. For example, endpoints 192A and 192B can connect directly to leaf switch 186A, which can connect endpoints 192A and 192B to the fabric 182 and/or any other of the leaf switches 186. Similarly, controller 102 (which can be the same as controller 102 described above with reference to FIG. 1A) can connect directly to leaf switch 186C, which can connect controller 102 to the fabric 182 and/or any other of the leaf switches 186. On the other hand, endpoints 192C and 192D can connect to leaf switch 186A and 186B via network 188. Moreover, the wide area network (WAN) 190 can connect to the leaf switches 186N.

Endpoints 192 can include any communication device or resource, such as a computer, a server, a cluster, a switch, a container, a VM, a virtual application, etc. In some cases, the endpoints 192 can include a server or switch configured with a virtual tunnel endpoint functionality which connects an overlay network with the fabric 182. For example, in some cases, the endpoints 192 can represent hosts (e.g., servers) with virtual tunnel endpoint capabilities, and running virtual environments (e.g., hypervisor, virtual machine(s), containers, etc.). An overlay network associated with the endpoints 192 can host physical devices, such as servers; applications: EPGs; virtual segments; virtual workloads; etc. Likewise, endpoints 192 can also host virtual workloads and applications, which can connect with the fabric 182 or any other device or network, including an external network.

Figure 2:
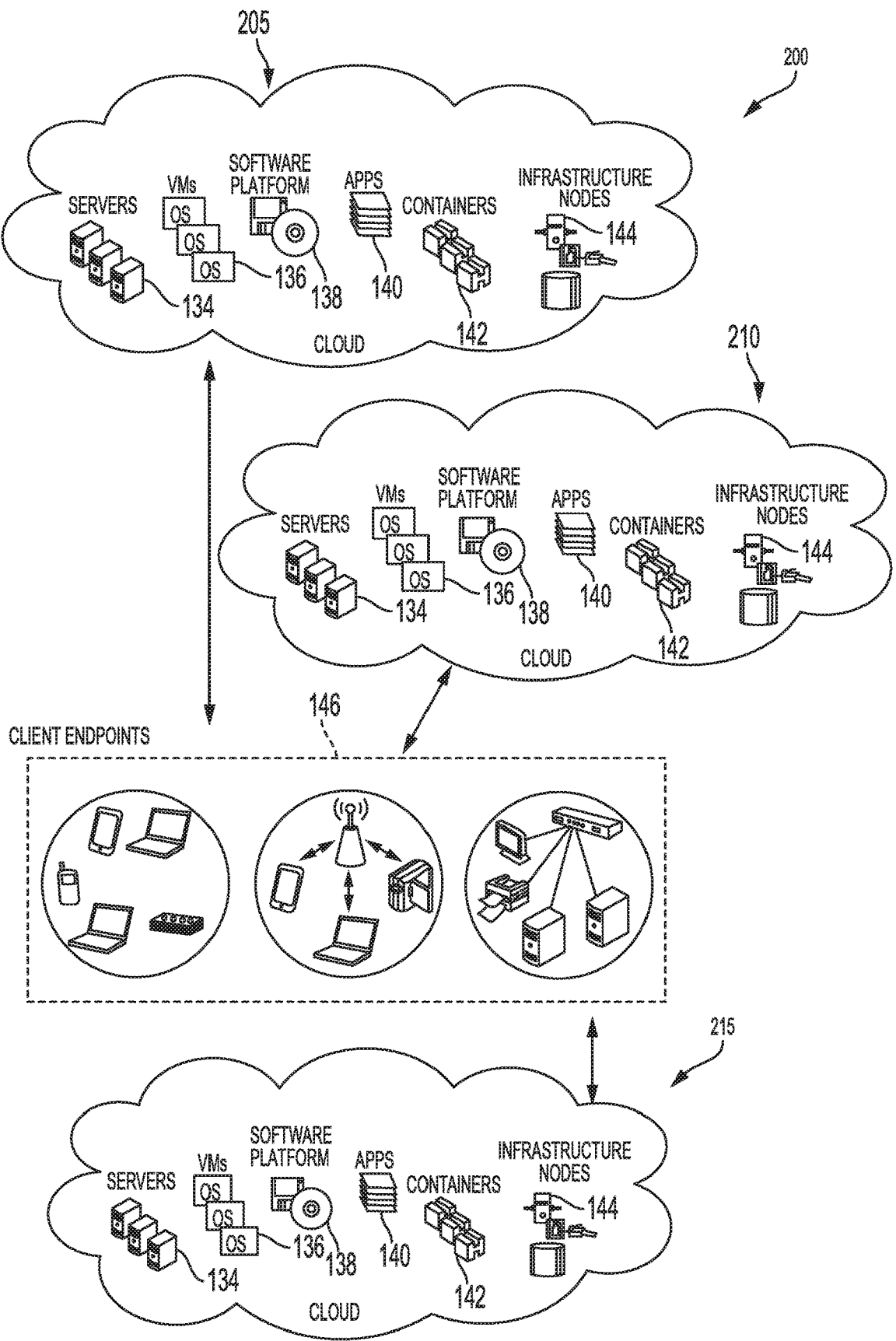
FIG. 2 illustrates a multi-cloud environment, according to one aspect of the present disclosure.

FIG. 2 illustrates a multi-cloud environment, according to one aspect of the present disclosure. Multi-cloud environment 200 includes first cloud environment 205, second cloud environment 210, third cloud environment 215 and client endpoints 146. Each one of first cloud environment 205, second cloud environment 210 and third cloud environment 215 can be the same as cloud 132 described above with reference to FIGS. 1A-D. Furthermore, each one of first cloud environment 205, second cloud environment 210 and third cloud environment 215 can have one or more elements of cloud 132 (e.g., servers 134, VMs 136, software platforms 138, Applications 140, containers 142 and infrastructures nodes 144, as described above with reference to FIG. 1B).

Furthermore, each one of first cloud environment 205, second cloud environment 210 and third cloud environment 215 can be located in a separate geographical location and/or operated by a different cloud service provider.

Client endpoints 146 are the same as those described above with reference to FIGS. 1-D and thus for sake of brevity, will not be further described. Various types of workloads, as requested by one or more client endpoints (or other component of first cloud environment 205, second cloud environment 210 and third cloud environment 215) can be received at one or more of first cloud environment 205, second cloud environment 210 and third cloud environment 215 for processing.

As will be described below, various application processes and services to be provided as part of a workload requested by a client endpoint and/or other cloud network components can be provided by components in the same one of first cloud environment 205, second cloud environment 210 and third cloud environment 215 or by different components located in different ones of first cloud environment 205, second cloud environment 210 and third cloud environment 215. Accordingly, there is a need to determine, when going from one process (function) on the underlying data to the next as part of a requested service or workload, which cloud environment (network component on such cloud environment) to perform the next function or process on such that costs associated with transition/migration of data from one network component to the next over multiple cloud environments is reduced/minimized. This will be further described with reference to FIGS. 5 and 6.

In one example and while not shown in FIG. 2, a network controller that can be implemented on one or more of first cloud environment 205, second cloud environment 210 and third cloud environment 215 can be configured to manage workload distribution among multiple clouds and determine destination for each function in a chain of functions/processes to be performed as part of a requested workload and process. Such controller can be, for example, the same as controller 102 described above with reference to FIG. 1A.

While FIG. 2 illustrates three different cloud environments, the present disclosure is not limited thereto and there can be many more or fewer number of cloud environments among which various functions are performed.

Figure 3:
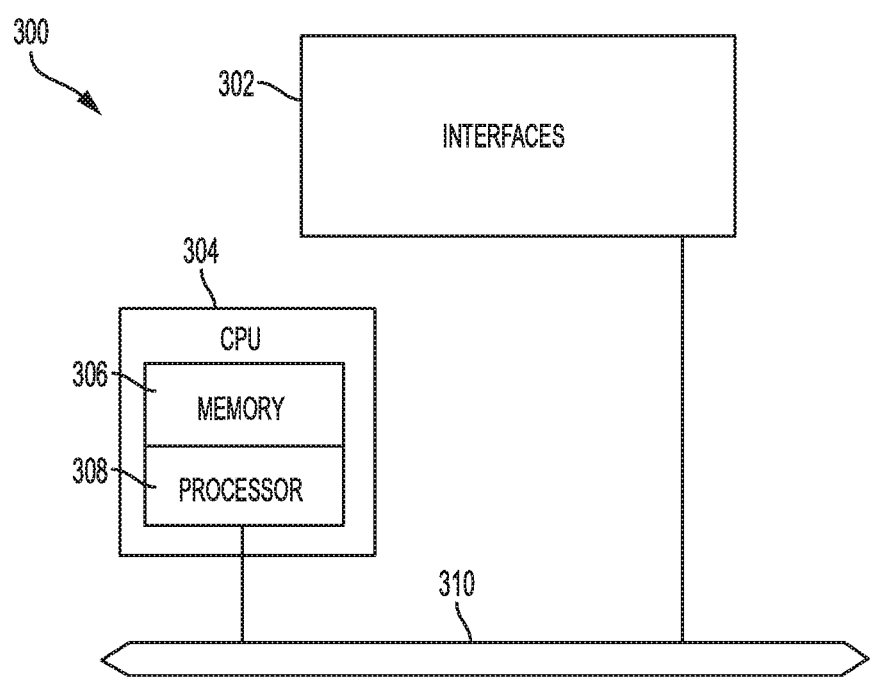
FIG. 3 illustrates an example network device suitable for performing switching, routing, load balancing, and other networking operations, according to an aspect of the present disclosure.

FIG. 3 illustrates an example network device suitable for performing switching, routing, load balancing, and other networking operations, according to an aspect of the present disclosure. In one example, network device 300 can be controller 102 and/or any one of components 122 of FIG. 1A. Network device 300 includes a central processing unit (CPU) 304, interfaces 302, and a bus 310 (e.g., a PCI bus). When acting under the control of appropriate software or firmware, CPU 304 is responsible for executing packet management, error detection, and/or routing functions. CPU 304 preferably accomplishes all these functions under the control of software including an operating system and any appropriate applications software. CPU 304 may include one or more processors 308, such as a processor from the INTEL X86 family of microprocessors. In some cases, processor 308 can be specially designed hardware for controlling the operations of network device 300. In some cases, a memory 306 (e.g., non-volatile RAM, ROM, etc.) also forms part of CPU 304. However, there are many different ways in which memory could be coupled to the system.

Interfaces 302 are typically provided as modular interface cards (sometimes referred to as "line cards"). Generally, they control the sending and receiving of data packets over the network and sometimes support other peripherals used with network device 300. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces. WIFI interfaces, 3G/4G/5G cellular interfaces. CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master microprocessor 304 to efficiently perform routing computations, network diagnostics, security functions, etc.

Although the system shown in FIG. 3 is one specific network device of the present invention, it is by no means the only network device architecture on which the present invention can be implemented. For example, an architecture having a single processor that handles communications as well as routing computations, etc., is often used. Further, other types of interfaces and media could also be used with network device 300.

Regardless of the network device's configuration, it may employ one or more memories or memory modules (including memory 306) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 306 could also hold various software containers and virtualized execution environments and data.

Network device 300 can also include an application-specific integrated circuit (ASIC), which can be configured to perform routing and/or switching operations. The ASIC can communicate with other components in network device 300 via bus 310, to exchange data and signals and coordinate various types of operations by network device 300, such as routing, switching, and/or data storage operations, for example.

Figure 4:
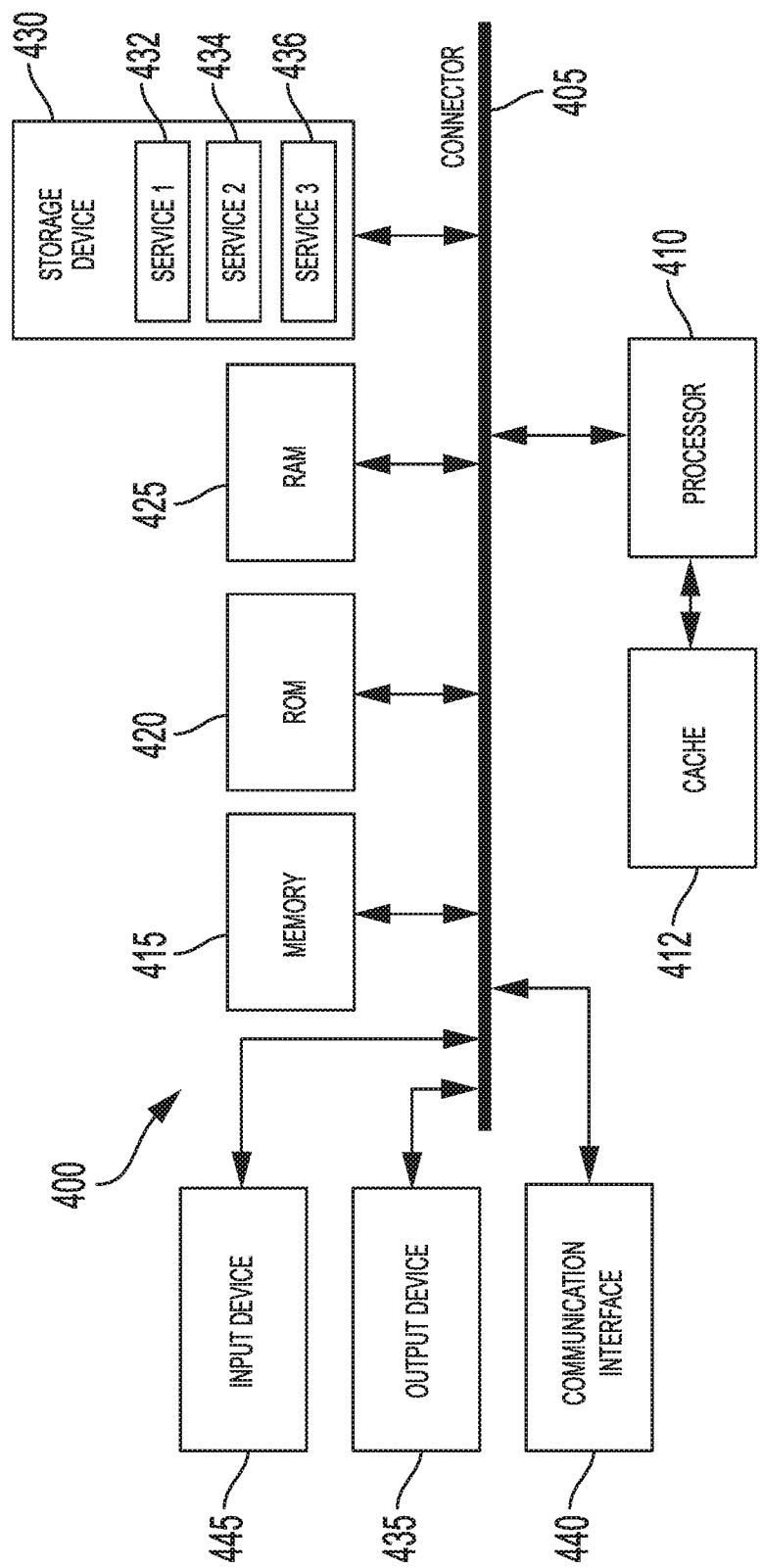
FIG. 4 illustrates a computing system architecture, according to an aspect of the present disclosure.

FIG. 4 illustrates a computing system architecture, according to an aspect of the present disclosure. As shown in FIG. 4, components of system 400 are in electrical communication with each other using a connector 405, such as a bus. Exemplary system 400 includes a processing unit (CPU or processor) 410 and the connector 405 that couples various system components including system memory 415, read only memory (ROM) 320 and random access memory (RAM) 425, to processor 410. System 400 can include a cache 412 of high-speed memory connected directly with, in close proximity to, or integrated as part of the processor 410. System 400 can copy data from memory 415 and/or storage device 430 to cache 412 for quick access by processor 410. In this way, the cache 412 can provide a performance boost that avoids processor 410 delays while waiting for data. These and other modules can control or be configured to control the processor 410 to perform various actions. Other system memory 415 may be available for use as well. Memory 415 can include multiple different types of memory with different performance characteristics. Processor 410 can include any general purpose processor and a hardware or software service, such as Service 1 432, Service 2 434, and Service 3 436 stored in storage device 430, configured to control processor 410 as well as a special-purpose processor where software instructions are incorporated into the actual processor design. Processor 410 may be a completely self-contained computing system, containing multiple cores or processors, a bus, memory controller, cache, etc. A multi-core processor may be symmetric or asymmetric.

To enable user interaction with the computing device 400, an input device 445 can represent any number of input mechanisms, such as a microphone for speech, a touch-sensitive screen for gesture or graphical input, keyboard, mouse, motion input, speech and so forth. An output device 435 can also be one or more of a number of output mechanisms known to those of skill in the art. In some instances, multimodal systems can enable a user to provide multiple types of input to communicate with computing device 400. The communications interface 440 can generally govern and manage the user input and system output. There is no restriction on operating on any particular hardware arrangement and therefore the basic features here may easily be substituted for improved hardware or firmware arrangements as they are developed.

Storage device 430 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 425, read only memory (ROM) 420, and hybrids thereof.

The storage device 430 can include services 432, 434, 436 for controlling the processor 410. Other hardware or software modules are contemplated. The storage device 430 can be connected to the connector 405. In one aspect, a hardware module that performs a particular function can include the software component stored in a computer-readable medium in connection with the necessary hardware components, such as the processor 410, connector 405, output device 435, and so forth, to carry out the function.

As indicated above, for data-intensive workloads (e.g., a log processing workload), there may be several functions to be performed on the underlying data. For instance, in the log processing workload, a first function can be performed (implemented, carried out, etc.) that receives machine logs and converts them to a certain format. The first function can be referred to as the conversion function. A second function can be performed for analyzing the converted machine logs, where the analysis can include filtering, pattern recognition, etc. The second function can be referred to as the analysis function. A third function can be performed for outputting and storing the analyzed machine logs. The third function can be referred to as the output or storing function.

In one scenario, the first function is performed in cloud environment 205 (or alternatively in one of cloud environments 210 and cloud environments 215) of FIG. 2. The third function can then be performed in either the same cloud environment as the first function or a different cloud environment. The present disclosure is then directed to determining which cloud environment, the intermediate function (the second function) is to be performed at so that the cost associated with migrating data (e.g., the converted machine logs in the example above) is minimized (e.g., whether the second function is to be performed in the same cloud environment as the first function and/or the third function or alternatively at a different cloud environment). This process can be referred to as a workload placement process in a multi-cloud environment or alternatively function placement process in a multi-cloud environment.

In one example, performing a function at a particular cloud environment is meant to include performing the function at a network node that is part of the particular cloud environment.

Hereinafter, a process for workload placement in a multi-cloud environment is described with reference to FIGS. 5 and 6.

Figure 5:
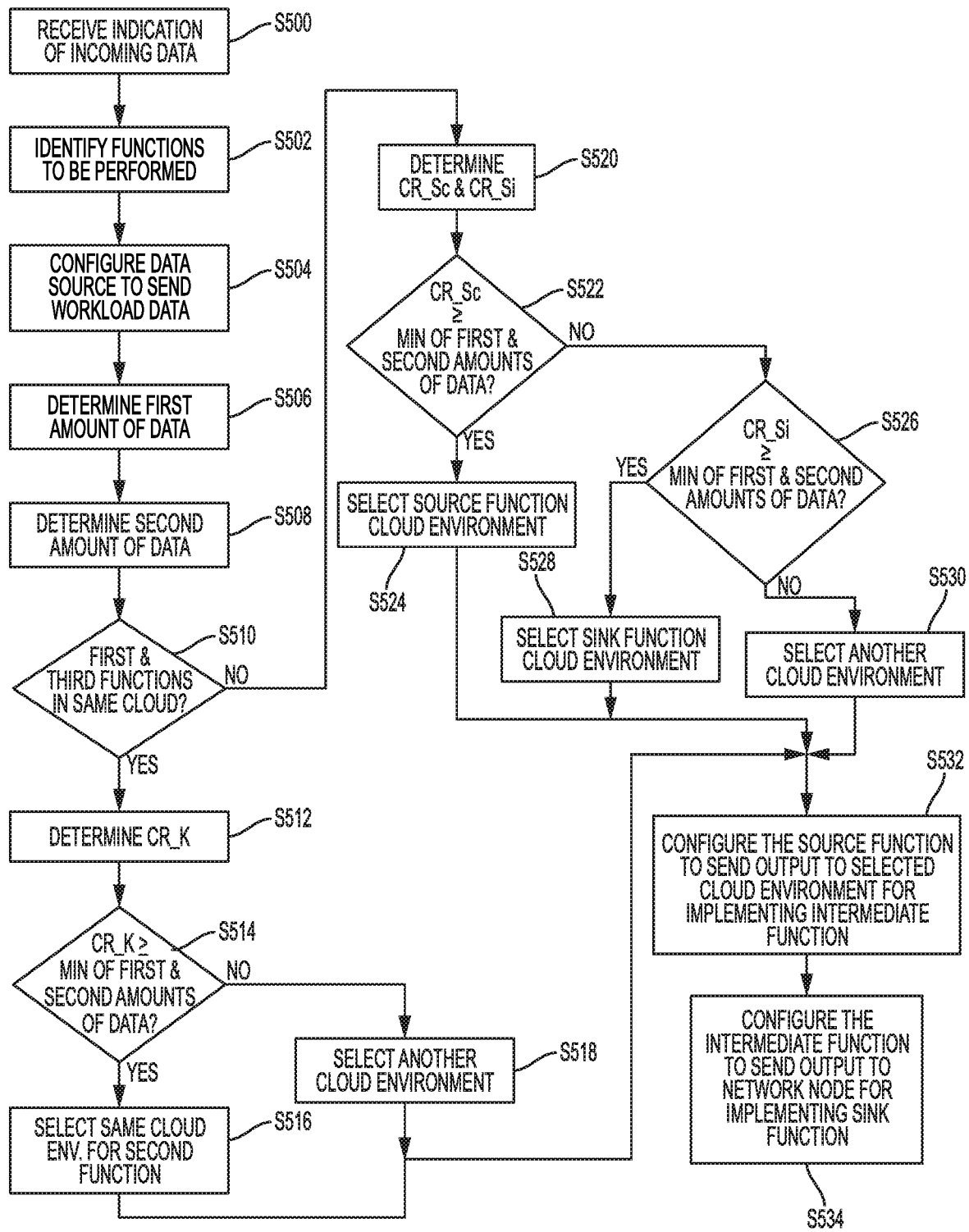
FIG. 5 illustrates a method of workload placement in a multi-cloud environment, according to an aspect of the present disclosure.

FIG. 5 illustrates a method of workload placement in a multi-cloud environment, according to an aspect of the present disclosure. FIG. 5 will be described from the perspective of controller (system management component) 102 of FIG. 1A. However, it will be appreciated that one or more processors of controller 102 such as processor 104 execute computer-readable instructions stored on one or more memories such as memory 106 to transform the one or more processors into special purpose processor(s) for carrying out the functionalities and the process of FIG. 5.

At S500, controller 102 receives an indication of incoming data (e.g., underlying data) on which a particular set of functions are to be implemented. For example, controller 102 receives an indication from a data source indicating that incoming data is to be sent to a source function (e.g., the conversion function of the example described above) for processing. The data source can be communicatively coupled to the network node on which the source function is implemented and can be, for example, a database, a network gateway, a data stream pipeline, one or more client endpoints (e.g., client endpoints 146), etc. In another example, controller 102 can receive the indication from the network node on which the source function is implemented, where the network node sends the indication indicating the incoming data is received at the network node from a data source.

This data can also be referred to as workload data. The workload data can be, for example, machine logs of the example described above.

At S502, controller 102 identifies the functions to be performed on the workload data. These functions can be, for example, the conversion function, the analysis function and the output or storing function of the example described above. Hereinafter, the first function is also referred to as a source function (Sc), the second function is also referred to as an intermediate function (f(x)) and the third function is also referred to as the sink function (Si).

At S504, controller 102 configures the data source to send the workload data of S500 to a cloud environment (e.g., a network node in a cloud environment) for performing the first function thereon. For example, if the first function is to be implemented by an application 140 in cloud environment 205, then controller 102 can send a command to the data source directing the data source to send the workload data of S500 to cloud environment 205 and more particularly to a server 134 of cloud environment 205 that implements the application 140.

Upon performance of the first function on the workload data, at S504, controller 102 determines an average amount of data traffic between the first function and the second function (between the source function and the intermediate function). This average amount of data traffic can be referred to as the first amount of data.

In one example, the first amount of data between the source function Sc and intermediate function fix) is represented as w(Sc,f(x)). The value of the first amount of data can be represented in terms of messages per second, for example. Controller 102 determines the first amount of data according to any known, or to be developed method.

At S508, controller 102 determines an average amount of data traffic between the second function and the third function (between the intermediate function and the sink function). This average amount of data traffic can be referred to as the second amount of data.

In one example, the second amount of data between the intermediate function f(x) and sink function Si is represented as w(f(x),Si). The value of the second amount of data can be represented in terms of messages per second, for example. Controller 102 determines the second amount of data according to any known, or to be developed method.

At S510, controller 102 determines whether the first function Sc and the third function Si are in the same cloud environment (e.g., are performed at network node(s) belonging to the same one of cloud environments 205, 210 or 215).

If at S510, controller 102 determines that the first function Sc and the third function Si are in the same cloud environment, then at S512, controller 102 determines a capacity of the same cloud environment on which the first function Sc and the third function Si are implemented. The capacity can be a processing capacity of the cloud environment (or that of corresponding network node(s) of the same cloud environment). This capacity can be represented at CR_k, where k is an index identifying a particular cloud environment (e.g., k can be 205, 210 and 215 corresponding to one of cloud environments 205, 210 and 215 of FIG. 2).

At S514, controller 102 determines whether CR_k is equal to or greater than a minimum of the first amount of data w(Sr,f(x)) and second amount of data w(f(x),Si). In one example, the requirement of CR_k being equal to or greater than the minimum of the first amount of data and the second amount of data ensures that functions are executed such that a particular service level agreement (SLA) between the cloud provider and the corresponding client for which the workload process is being carried out, is satisfied.

If at S514, controller 102 determines that CR_k is equal to or greater than a minimum of the first amount of data and the second amount of data, then at S516, controller 102 determines that the intermediate function (second function f(x)) is to be performed/implemented on the same cloud environment (e.g., one of cloud environments 205, 210 and 215) as the one on which the source function Sc and the sink function Si are implemented. Thereafter, the process proceeds to S532 and S534 as will be further described below.

However, if at S514, controller 102 determines that CR_k is less than the minimum of the first amount of data and the second amount of data, then at S518, controller 102 selects another cloud environment for implemented the second function on. This selected cloud environment can also be referred to as a selected Point of Delivery (POD). In one example, the cloud environment selected at S518 is a cloud environment that satisfied two conditions. The first condition is that a corresponding CR_k of the selected cloud environment is equal to or greater than a minimum of the first amount of data and the second amount data. The second condition is that a cost (a sum of costs, a total cost, etc.) of migrating (transitioning) the output of the first function (outcome of the first function) from a cloud environment on which the first function is implemented (C_Sc) to the selected cloud environment on which the second function is to be implemented (C_f(x)) (where the cost function can be represented as C(C_Sc, C_f(x)) and a cost of migrating (transitioning) the output of the second function (outcome of the second function) from the cloud environment on which the second function is implemented (C_f(x)) to a cloud environment on which the third function (C_Si) is implemented (where the cost function can be represented as C(C_f(x), C_Si), are minimized among all costs associated with migrating the output of the first function from C_Sc and (in addition to) the output of the second function from C_f(x), respectively, to any other cloud environment on which the first function (Source function) and/or second function (intermediate function) are to be implemented. Thereafter, the process proceeds to S532 and S534 as will be further described below.

Referring back to S510, if controller 102 determines that the first function (source function Sc) and the third function (sink function Si) are not implemented on the same cloud environment, then at S520, controller 102 determines the CR_Sc and CR_Si in a same manner as described above with respect to S512.

Thereafter, at S522, controller 102 determines if CR_Sc is equal to or greater than a minimum of the first amount of data and the second amount of data. If at S522, controller 102 determines that CR_Sc is equal to or greater than the minimum of the first amount of data and the second amount of data, then at S524, controller 102 selects the same cloud environment as the one on which the source function Sc is implemented (source function cloud environment) for implementing the intermediate function f(x). Thereafter, the process proceeds to S532 and S534 as will be further described below.

However, if at S522, controller 102 determines that CR_Sc is less than a minimum of the first amount of data and the second amount of data, then at S526, controller 102 determines if the processing capacity of the cloud environment on which the sink function is implemented (CR_Si) is equal to or greater than a minimum of the first amount of data and the second amount of data.

If at S526, controller 102 determines that CR_Si is equal to or greater than the minimum of the first amount of data and the second amount of data, then at S528, selects the same cloud environment as the one on which the source function Sc is implemented (sink function cloud environment) for implementing the intermediate function f(x). Thereafter, the process proceeds to S532 and S534 as will be further described below.

However, if at S526, controller 102 determines that CR_Si is less than the minimum of the first amount of data and the second amount of data, then at S530, controller 102 selects another cloud environment for implemented the second function on in a same manner as in S518 described above. This selected cloud environment can also be referred to as a selected Point of Delivery (POD). In one example, the cloud environment selected at S530 is a cloud environment that satisfied two conditions. The first condition is that a corresponding CR_k of the selected cloud environment is equal to or greater than a minimum of the first amount of data and the second amount data. The second condition is that a cost of migrating the output of the first function (out of the first function) from a cloud environment on which the first function is implemented (C_Sc) to the selected cloud environment on which the second function is to be implemented (C_f(x)) (where the cost function can be represented as C(C_Si, C_f(x)), is minimized among all costs associated with migrating the output of the first function from C_Sc to any other cloud environment on which the second function is to be implemented. Thereafter, the process proceeds to S532 and S534 as will be further described below.

At S532 and upon selecting the appropriate cloud environment for implementing the intermediate function on (selected POD), controller 102 configures the source function (e.g., sends a command to a network node on which the source function is implemented) to send the outcome (output) of the first function to the selected appropriate cloud environment for implementing the intermediate function thereon (which may or may not be the same as the cloud environment on which the source function is performed).

Upon implementation of the intermediate function on the outcome of the first function, at S534, controller 102 configures the intermediate function (e.g., sends a command to a network node on which the intermediate function is implemented) to send the outcome (output) of the intermediate function to a cloud environment on which the sink function is performed (which may or may not be the same as the cloud environment on which the intermediate function is performed). Thereafter, the process ends.

It can be appreciated that while FIG. 5 has been described with reference to an example in which three functions are to be performed, the present disclosure is not limited thereto. For example there can be more than one intermediate function (a total of 4 functions, 5 functions, etc.). Accordingly, controller 102 implements the process of FIG. 5 for selecting a cloud environment for each intermediate function, where for each intermediate function the immediately preceding function is the source function while the sink function remains the same for all intermediate functions.

Having described a process of selecting a cloud environment for workload placement, there can be instances where the functions (e.g., source, intermediate and sink functions) are to be performed to a tuple of data at a particular point in time (predetermined point of time or simply predetermined time).

For instance, taking back up searches as a particular example of a workload (which can have several functions performed as part of the entire process), the functions can be scheduled for performance every 12 hours, once every 24 hours, etc.

However, if controller 102 waits until all workload data is received up to the particular point in time before implementing the functions thereon, there can be high data traffic involved, which makes the application of the process of FIG. 5 more challenging and difficult.

Accordingly, the present disclosure includes a process at which the functions (e.g., functions of backup searches) are implemented on received workload data at designated points of time (plurality of target times) between the start of receiving workload data and the predetermined point of time. In the example of backup searches, these designated points in time can be every 3 hours between 12:00 AM to 11:59 PM or every 6 hours between 12:00 AM to 11:59 AM, etc.

In accordance with this process, the result of implementing the functions at each designated point in time is temporarily saved. Upon reaching the predetermined point in time, a determination is made as to whether the data has changed or not. If the data is changed, the temporarily stored results can be discarded and the functions can be performed on the entirety of the workload data received up to the predetermined point in time. However, if the workload data is unchanged, only the unprocessed portion of the workload data can be processed by the functions at the predetermined point of time, the result of which is augmented by the temporary stored results at designated points of time. This piecemeal implementation of the functions for a particular workload can reduce the amount of data traffic and better performance of cloud environment selection process of FIG. 5. This process is further described below with reference to FIG. 6.

Figure 6:
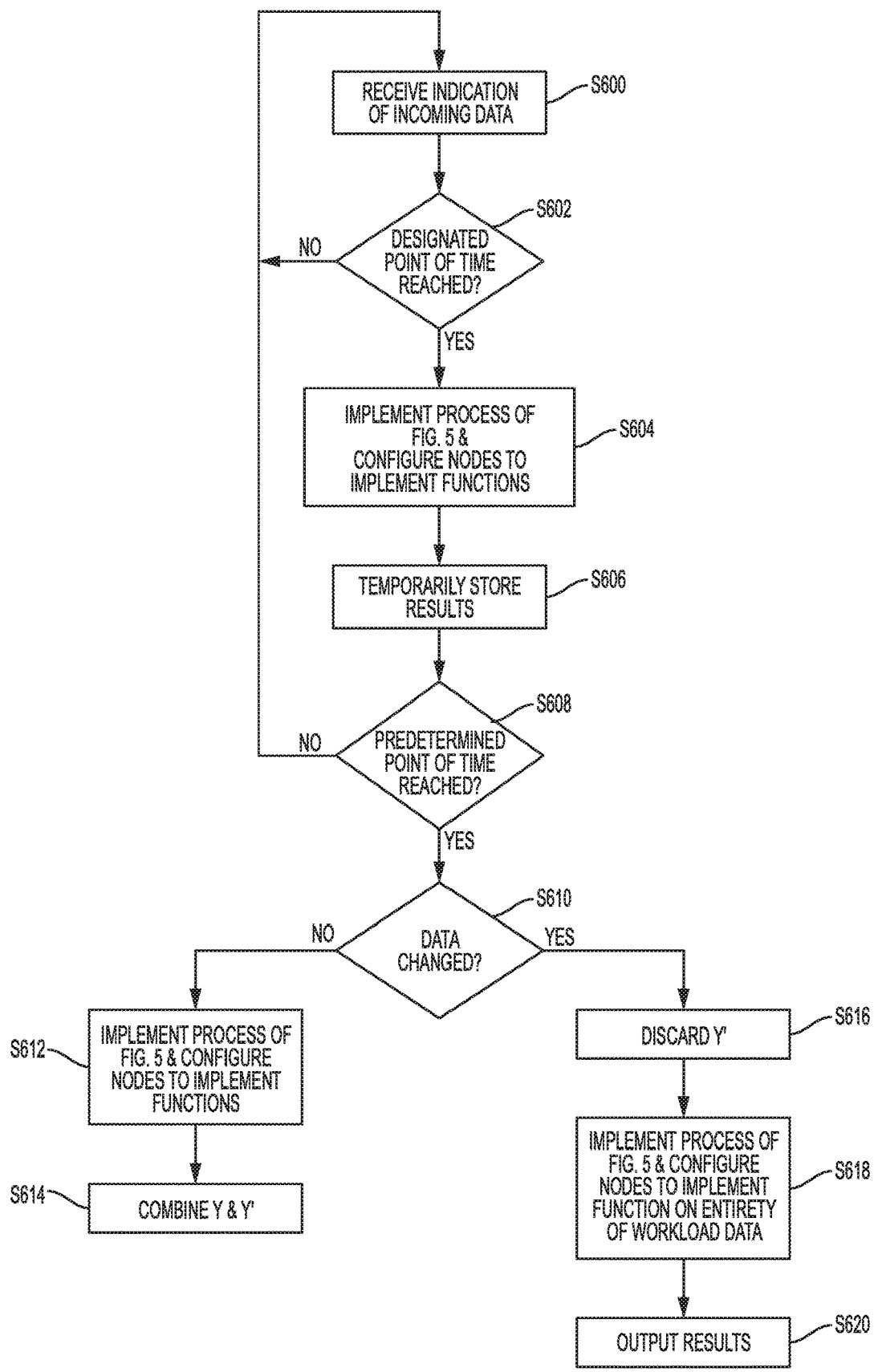
FIG. 6 illustrates a method of workload placement in a multi-cloud environment, according to an aspect of the present disclosure.

FIG. 6 illustrates a method of workload placement in a multi-cloud environment, according to an aspect of the present disclosure. FIG. 6 will be described from the perspective of controller (system management component) 102 of FIG. 1A. However, it will be appreciated that one or more processors of controller 102 such as processor 104 execute computer-readable instructions stored on one or more memories such as memory 106 to transform the one or more processors into special purpose processor(s) for carrying out the functionalities and the process of FIG. 6.

At S600, controller 102 receives an indication of incoming workload data (or portions thereof) in a similar manner as described above with reference to S500. In one example, the workload data is defined as a batch represented by D(t)=[d-0, d-1, d-2, . . . , d-t], where each of 0, 1, 2, . . . , t, represent a designated point of time. In one example, "T" can represent the predetermined period of time, described above. Accordingly, d-0 is a chunk of the workload data received up to the first designated point of time 0, d-1 is a chunk of data received between the first designated point of time 0 and the second designated period of time 1, etc. d-0, d-1, d-2 to d-t can be referred to as plurality of data segments.

At S602, controller 102 determines if a designated point of time such as one of designated points of time 0, 1, 2, etc., is reached. If controller 102 determines that a designated point of time is not reached, the process reverts back to S600 and controller 102 continues to receive workload data until a designated point of time is reached.

If at S602, controller 102 determines that the designated point of time is reached, then at S604, controller 102 implements the process of FIG. 5 for selecting a cloud environment for workload placement and configures (e.g., sends commands to) network nodes corresponding to the first function, the second function and the third function to implement corresponding functions (e.g., source, intermediate and sink functions described above) on the chunk of data corresponding to the reached designated point in time. For example, upon reaching the designated point of time 0, controller 102 implements the process of FIG. 5 to determine a cloud environment for implementing the intermediate function f(x) and thereafter implements source, intermediate and sink function of data chunk d-0.

Thereafter, at S606, controller 102 temporary stores (in an associated memory) the result of implementing the functions of the chunk of data corresponding to the reached designated point in time (e.g., the result of implementing the functions on d-0). This temporary stored result can be represented y'.

In one example, every time controller 102 repeats S602 to S606, controller 102 updates y' with new results of implementing the functions on the latest chunks of workload data.

At S608, controller 102 determines if the predetermined point of time is reached. This can be, for example, the time T (e.g., performed search backups every 12 hours, once every 24 hours, etc., as described above). If controller 102 determines that the predetermined point of time is not reached at S608, then the process reverts back to S600 and controller 102 repeats S600 to S608.

However, if at S608, controller 102 determines that the predetermined point of time is reached, then at S610, controller 102 determines if workload data is changed. In one example, if the workload data at the predetermined period of time T (d-T) is a concatenation of all received data chunks (i.e., D(T)=[D(t), [d-t+1, d-t+2, . . . , d-T]]), then controller 102 determines that workload data is not changed. Otherwise, controller 102 determines that workload data is changed at the predetermined point of time.

If at S608, controller 102 determines that the workload data is not changed, then at S612 controller 102 implements the process of FIG. 5 for placement of intermediate function on a cloud environment and then configures (e.g., sends commands to) network nodes corresponding to the first function, the second function and the third function to implement functions (e.g., source, intermediate and sink functions described above) on data chunks received between a last time S604 and S606 were implemented and the predetermined period of time. The result of this process can be designated y.

Thereafter at S614, controller 102 combines y' (temporarily stored results at S606) and y to output (and/or optionally store) the result of implementing the functions on all of the plurality of data chunks. Thereafter the process ends or alternatively reverts back to S600, where controller 102 repeats the process of FIG. 6.

However, if at S608, controller 102 determines that the workload data is changed, then at S616 controller 102 discards y' (the temporarily stored results of S606). Then at S618, controller 102 implements the process of FIG. 5 on the entirety of workload data (i.e., data received from the point in time at which controller 102 started received workload data at S600 up to and include data received at the predetermined point of time T) and configures (e.g., sends commands to) network nodes corresponding to the first function, the second function and the third function to implement corresponding functions (e.g., source, intermediate and sink functions described above) on the entirety of workload data.

Thereafter, at S620, controller 102 outputs the result of implementing the functions on entirety of the workload data. Thereafter the process ends or alternatively reverts back to S600, where controller 102 repeats the process of FIG. 6.

Examples described above with reference to the accompanying figures provide an improvement to one or more aspects of existing methods and systems for optimizing placement of workloads across multiple clouds (a network of distributed cloud environments). Such optimization plays an important role in the technological field of modern software services, many components of which have complex dependencies and operate in real-time and in a distributed fashion. It is an important factor for any network operator using these services to optimize the usage of available network resources and reduce the associated costs in order to provide their customers with better and more efficient services. For example, there are costs associated with performing certain functions at certain locations within a cloud network and/or migrating underlying processed (or to be processed data) from one cloud environment to another, as described above. A blind (random) selection of a cloud environment for implementing a network function on the underlying data can increase a network operator's resource consumption and/or cost. Therefore, it is important to provide a method, as described above, for determining a cloud environment for implementing a network function on the underlying data, which improves network resource consumption and reduces associated costs for network operators.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A. B, or A and B.

What is claimed is:

1. A computer-implemented method for selecting a network to implement a serverless function, the method comprising:
   determining, by one or more processors of a network controller, a first throughput based on a first amount of data for transitioning from performing a first serverless function on input data within a source network to performing a second serverless function on a first outcome of the first serverless function;
   determining, by the one or more processors, a second throughput based on a second amount of data for transitioning from performing the second serverless function on the first outcome to performing a third serverless function on a second outcome of the second serverless function within a sink network;
   determining a processing capacity for each of one or more networks on which the first serverless function and the third serverless function are implemented; and
   selecting a network for implementing the second serverless function based on the first throughput, the second throughput, and the processing capacity for each of the networks.

2. The method of claim 1, wherein the first serverless function and the second serverless function are implemented on the sink network.

3. The method of claim 2, further comprising:
   determining the processing capacity of the source network is equal to or greater than the first throughput and the second throughput.

4. The method of claim 1, further comprising:
   implementing the second serverless function on the sink network if the processing capacity of the source network is less than the first throughput and the second throughput.

5. The method of claim 4, further comprising:
   determining a second processing capacity of the sink network is greater than the first throughput and the second throughput and a cost associated with transitioning data corresponding to the first outcome and the second serverless function from the source network to the sink network is minimized among all costs associated with transitioning the data corresponding to the first outcome and the second serverless function from the source network to any other available network.

6. The method of claim 1, wherein the first serverless function and the third serverless function are implemented on the source network and the sink network, respectively, and the method further comprises:
   determining a first processing capacity of the source network;
   determining a second processing capacity of the sink network;
   implementing the second serverless function on the source network if the first processing capacity of the source network is equal to or greater than the first throughput and the second throughput;
   implementing the second serverless function on the sink network if,
      (1) the first processing capacity of the source network is less than the first throughput and the second throughput, and
      (2) the second processing capacity of the sink network is equal to or greater than the first throughput and the second throughput; and
   implementing the second serverless function on a third network if,
      (1) the first processing capacity of the source network is less than the first throughput and the second throughput,
      (2) the second processing capacity of the sink network is less than the first throughput and the second throughput,
      (3) a third processing capacity of the third network is equal to or greater than the first throughput and the second throughput, and
      (4) a cost associated with transitioning data corresponding to the first outcome and the second serverless function from the source network to the third network is minimized among all costs associated with transitioning the data corresponding to the first outcome and the second serverless function from the source network to any other available network.

7. The method of claim 1, further comprising:
   receiving an indication of a plurality of data segments to be processed according to the first serverless function, the second serverless function, and the third serverless function at a predetermined time;
   at one or more of a plurality of target times prior to the predetermined time,
      performing the first serverless function, the second serverless function, and the third serverless function on available ones of the plurality of data segments to yield first processed data; and
      storing the first processed data.

8. The method of claim 7, further comprising:
   determining, at the predetermined time, if the plurality of data segments are unchanged;
   if the plurality of data segments are unchanged,
      performing the first serverless function, the second serverless function, and the third serverless function on remaining ones of the plurality of data segments received between a last one of the plurality of target times and the predetermined time to yield second processed data;
      storing the second processed data; and
      combining the first processed data and the second processed data; and
   if the plurality of data segments are changed,
      discarding the first processed data;
      performing the first serverless function, the second serverless function, and the third serverless function on a complete set of the plurality of data segments to yield third processed data; and
      storing the third processed data.

9. A system for selecting a network to implement a serverless function, the system comprising:
memory configured to store computer-readable instructions therein; and
one or more processors configured to execute the computer-readable instructions to:
determine a first throughput based on a first amount of data for transitioning from performing a first serverless function on input data within a source network to performing a second serverless function on a first outcome of the first serverless function;
determine a second throughput based on a second amount of data for transitioning from performing the second serverless function on the first outcome to performing a third serverless function on a second outcome of the second serverless function within a sink network;
determine a processing capacity for each of one or more networks on which the first serverless function and the third serverless function are implemented; and
select a network for implementing the second serverless function based on the first throughput, the second throughput, and the processing capacity for each of the networks.

10. The system of claim 9, wherein the first serverless function and the third serverless function are implemented on the source network, and the one or more processors are configured to execute the computer-readable instructions to further:
determine if the processing capacity of the source network is equal to or greater than the first throughput and the second throughput; and
implement the second serverless function on the sink network if the processing capacity of the source network is less than the first throughput and the second throughput.

11. The system of claim 10, wherein the one or more processors are configured to execute the computer-readable instructions to further:
determine a second processing capacity of the sink network is greater than the first throughput and the second throughput and a cost associated with transitioning data corresponding to the first outcome and the second serverless function from the source network to the sink network is minimized among all costs associated with transitioning the data corresponding to the first outcome and the second serverless function from the source network to any other available network.

12. The system of claim 10, wherein the source network and the sink network are associated with different cloud environments.

13. The system of claim 9, wherein the first serverless function and the second serverless function are implemented on the source network and the sink network, respectively, and the one or more processors are configured to execute the computer-readable instructions to further:
determine a first processing capacity of the source network;
determine a second processing capacity of the sink network;
implement the second serverless function on the source network if the first processing capacity of the source network is equal to or greater than the first throughput and the second throughput;
implement the second serverless function on the sink network if,
(1) the first processing capacity of the source network is less than the first throughput and the second throughput, and
(2) the second processing capacity of the sink network is equal to or greater than the first throughput and the second throughput; and
implement the second serverless function on a third network if,
(1) the first processing capacity of the source network is less than the first throughput and the second throughput,
(2) the second processing capacity of the sink network is less than the first throughput and the second throughput,
(3) a third processing capacity of the third network is equal to or greater than the first throughput and the second throughput, and
(4) a cost associated with transitioning data corresponding to the first outcome and the second serverless function from the source network to the third network is minimized among all costs associated with transitioning the data corresponding to the first outcome and the second serverless function from the source network to any other available network.

14. The system of claim 9, wherein the one or more processors are configured to execute the computer-readable instructions to further:
receive an indication of a plurality of data segments to be processed according to the first serverless function, the second serverless function, and the third serverless function at a predetermined time;
at one or more of a plurality of target times prior to the predetermined time,
perform the first serverless function, the second serverless function, and the third serverless function on available ones of the plurality of data segments to yield first processed data; and
store the first processed data.

15. The system of claim 14, wherein the one or more processors are configured to execute the computer-readable instructions to further:
determine, at the predetermined time, if the plurality of data segments are unchanged;
if the plurality of data segments are unchanged,
perform the first serverless function, the second serverless function, and the third serverless function on remaining ones of the plurality of data segments received between a last one of the plurality of target times and the predetermined time to yield second processed data;
store the second processed data; and
combine the first processed data and the second processed data; and
if the plurality of data segments are changed,
discard the first processed data;
perform the first serverless function, the second serverless function, and the third serverless function on a complete set of the plurality of data segments to yield third processed data; and
store the third processed data.

16. One or more non-transitory computer-readable medium having computer-readable instructions stored therein, which when executed by one or more processors, cause the one or more processors to:
determine a first throughput based on a first amount of data for transitioning from performing a first serverless function on input data within a source network to performing a second serverless function on a first outcome of the first serverless function;

determine a second throughput based on a second amount of data for transitioning from performing the second serverless function on the first outcome to performing a third serverless function on a second outcome of the second serverless function within a sink network;

determine a processing capacity for each of one or more networks on which the first serverless function and the third serverless function are implemented; and select a network for implementing the second serverless function based on the first throughput, the second throughput, and the processing capacity for each of the networks.

17. The one or more non-transitory computer-readable medium of claim 16, wherein the first serverless function and the third serverless function are implemented on the source network, and the one or more processors are configured to execute the computer-readable instructions to further:

determine if a first processing capacity of the source network is equal to or greater than the first throughput and the second throughput; and implement the second serverless function on the sink network if the processing capacity of the source network is less than the first throughput and the second throughput, a second processing capacity of the sink network is greater than the first throughput and the second throughput, and a cost associated with transitioning data corresponding to the first outcome and the second serverless function from the source network to the sink network is minimized among all costs associated with transitioning the data corresponding to the first outcome and the second serverless function from the source network to any other available network.

18. The one or more non-transitory computer-readable medium of claim 16, wherein the first serverless function and the second serverless function are implemented on the source network and the sink network, respectively, and the one or more processors are configured to execute the computer-readable instructions to further:

a first processing capacity of the source network;

a second processing capacity of the sink network;

implement the second serverless function on the source network if the first processing capacity of the source network is equal to or greater than the first throughput and the second throughput;

implement the second serverless function on the sink network if,
   (1) the first processing capacity of the source network is less than the first throughput and the second throughput, and
   (2) the second processing capacity of the sink network is equal to or greater than the first throughput and the second throughput; and implement the second serverless function on a third network if,
   (1) the first processing capacity of the source network is less than the first throughput and the second throughput,
   (2) the second processing capacity of the sink network is less than the first throughput and the second throughput,
   (3) a third processing capacity of the third network is equal to or greater than the first throughput and the second throughput, and
   (4) a cost associated with transitioning data corresponding to the first outcome and the second serverless function from the source network to the third network is minimized among all costs associated with transitioning the data corresponding to the first outcome and the second serverless function from the source network to any other available network node.

19. The one or more non-transitory computer-readable medium of claim 16, wherein the one or more processors are configured to execute the computer-readable instructions to further:

receive an indication of a plurality of data segments to be processed according to the first serverless function, the second serverless function, and the third serverless function at a predetermined time;

at one or more of a plurality of target times prior to the predetermined time,
   perform the first serverless function, the second serverless function, and the third serverless function on available ones of the plurality of data segments to yield first processed data; and
   store the first processed data.

20. The one or more non-transitory computer-readable medium of claim 19, wherein the one or more processors are configured to execute the computer-readable instructions to further:

determine, at the predetermined time, if the plurality of data segments are unchanged;

if the plurality of data segments are unchanged,
   perform the first serverless function, the second serverless function, and the third serverless function on remaining ones of the plurality of data segments received between a last one of the plurality of target times and the predetermined time to yield second processed data;
   store the second processed data; and
   combine the first processed data and the second processed data; and if the plurality of data segments are changed,
   discard the first processed data;
   perform the first serverless function, the second serverless function, and the third serverless function on a complete set of the plurality of data segments to yield third processed data; and
   store the third processed data.

* * * * *